(12) United States Patent
Kim et al.

(10) Patent No.: US 10,285,173 B2
(45) Date of Patent: May 7, 2019

(54) METHOD AND APPARATUS FOR TWO-HOP LINK COMMUNICATION IN WIRELESS COMMUNICATION NETWORK

(71) Applicants: Samsung Electronics Co. Ltd., Suwon-si, Gyeonggi-do (KR); Research & Business Foundation SUNGKYUNKWAN UNIVERSITY, Suwon-si, Gyeonggi-do (KR)

(72) Inventors: Kyungkyu Kim, Suwon-si (KR); Min Young Chung, Seoul (KR); Daegyun Kim, Seongnam-si (KR); Seunghoon Park, Seoul (KR); Sueng Jae Bae, Suwon-si (KR); Chiwoo Lim, Suwon-si (KR); Bum-Gon Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1235 days.

(21) Appl. No.: 13/963,557

(22) Filed: Aug. 9, 2013

(65) Prior Publication Data

US 2014/0044036 A1   Feb. 13, 2014

(30) Foreign Application Priority Data

Aug. 10, 2012   (KR) .......................... 10-2012-0087710

(51) Int. Cl.
*H04W 72/04* (2009.01)
*H04W 8/00* (2009.01)
(Continued)

(52) U.S. Cl.
CPC ....... *H04W 72/0446* (2013.01); *H04W 8/005* (2013.01); *H04W 40/22* (2013.01); *H04W 88/04* (2013.01)

(58) Field of Classification Search
CPC . H04W 72/0446; H04W 8/005; H04W 40/22; H04W 88/04; H04W 72/04; H04W 52/02
See application file for complete search history.

(56) References Cited

U.S. PATENT DOCUMENTS 6,975,641 B1 * 12/2005 Kurobe ............. H04Q 11/0478
370/445
8,072,917 B2   12/2011 Wu et al.
(Continued)

FOREIGN PATENT DOCUMENTS

| KR | 10-2007-0040108 A | 4/2007 |
| KR | 10-2010-0015780 A | 2/2010 |
| KR | 10-2011-0010889 A | 2/2011 |

OTHER PUBLICATIONS

Sungcheol Chang et al., 'Two-hop Operation to Relay Packets between Two TDC Links', IEEE C802.16n-11/0241, IEEE 802. 16 Broadband Wireless Access Working Group, Oct. 31, 2011.
(Continued)

*Primary Examiner* — Anez C Ebrahim
(74) *Attorney, Agent, or Firm* — Jefferson IP Law, LLP

(57) ABSTRACT

A two-hop link transmission method and apparatus are provided. The method includes establishing a two-hop link and scheduling transmission on the two-hop link in a Device-To-Device (D2D) communication network. The two-hop link transmission method includes identifying neighbor terminals available for communication with the transmission terminal, selecting one of the neighboring terminals as a recipient terminal, determining a type of a link to be established with the selected neighboring terminal between a single-hop link and two-hop link types, selecting, when the two-hop link type is determined, a relay terminal among the neighboring terminals, establishing the two-hop link with the recipient terminal via the relay terminal, allocating a Multi-Hop Connection Identifier (MCID) for the
(Continued)

two-hop link, and transmitting data to the recipient terminal through the two hop link.

15 Claims, 17 Drawing Sheets

(51) Int. Cl.
    *H04W 40/22* (2009.01)
    *H04W 88/04* (2009.01)

(56) References Cited

U.S. PATENT DOCUMENTS

| | | | |
|---|---|---|---|
| 2004/0162871 A1* | 8/2004 | Pabla | H04W 8/005 |
| | | | 709/201 |
| 2006/0092894 A1* | 5/2006 | Amano | H04L 1/0009 |
| | | | 370/338 |
| 2007/0025274 A1 | 2/2007 | Rahman et al. | |
| 2007/0041345 A1 | 2/2007 | Yarvis et al. | |
| 2007/0082621 A1 | 4/2007 | Lee et al. | |
| 2008/0008200 A1* | 1/2008 | Jeong | H04L 47/13 |
| | | | 370/401 |
| 2009/0201844 A1 | 8/2009 | Bhatti et al. | |
| 2009/0227258 A1* | 9/2009 | Youn | H04B 7/2606 |
| | | | 455/445 |
| 2010/0046400 A1* | 2/2010 | Wu | H04L 12/189 |
| | | | 370/256 |
| 2010/0110972 A1* | 5/2010 | Kang | H04B 7/155 |
| | | | 370/315 |
| 2011/0021193 A1 | 1/2011 | Hong | |
| 2011/0176478 A1* | 7/2011 | Inohiza | H04B 7/155 |
| | | | 370/315 |
| 2011/0182253 A1* | 7/2011 | Shekalim | H04W 28/18 |
| | | | 370/329 |
| 2012/0124627 A1* | 5/2012 | Kim | H04W 88/04 |
| | | | 725/62 |
| 2013/0016649 A1* | 1/2013 | Damnjanovic | H04W 88/04 |
| | | | 370/315 |
| 2014/0213244 A1* | 7/2014 | Oh | H04W 88/04 |
| | | | 455/419 |

OTHER PUBLICATIONS

Korean Notification of a Decision to Grant a Patent dated Oct. 30, 2018, issued in a counterpart Korean application No. 10-2012-0087710.

* cited by examiner

FIG. 5

| TERMINAL | TERMINAL IDENTIFIER | RECEIVED SIGNAL STRENGTH (dBm) |
|---|---|---|
| TERMINAL 1 | xxxxx… | 10 |
| TERMINAL 2 | yyyyy… | 14 |
| TERMINAL 3 | zzzzz… | 4 |
| … | … | … |

FIG. 10

| CLASSIFICATION | | LOW PRIORITY TRANSMISSION UNIT | |
|---|---|---|---|
| | | Tx | NON-Tx |
| HIGH PRIORITY TRANSMISSION UNIT | Tx | RELAY TERMINAL REQUEST/RESPOND FOR DATA TRANSMISSION TO RECIPIENT TERMINAL | TRANSMISSION TERMINAL REQUEST/RESPONSE FOR DATA TRANSMISSION TO RELAY TERMINAL |
| | NON-Tx | RELAY TERMINAL NOTIFY TRANSMISSION TERMINAL OF DATA RELAY COMPLETION | NO ACTION |

METHOD AND APPARATUS FOR TWO-HOP LINK COMMUNICATION IN WIRELESS COMMUNICATION NETWORK

CROSS-REFERENCE TO RELATED APPLICATION(S)

This application claims the benefit under 35 U.S.C. § 119(a) of a Korean patent application filed on Aug. 10, 2012 in the Korean Intellectual Property Office and assigned Ser. No. 10-2012-0087710, the entire disclosure of which is hereby incorporated by reference.

TECHNICAL FIELD

The present disclosure relates to a two-hop link communication method and apparatus of a wireless communication system. More particularly, the present disclosure relates to a method and an apparatus for establishing a two-hop link and scheduling transmission on the two-hop link in a Device-To-Device (D2D) communication network.

BACKGROUND

In a D2D communication network, a terminal identifies neighboring terminals that are adjacent geometrically and establishes a radio link with one of the identified neighboring terminals, if needed, to communicate data. Such a procedure is performed between the terminals in a distributed manner without assistance of other network nodes and thus, the D2D communication is advantageous in commercialization without extra infrastructure as compared to other wireless communication networks.

In addition, the D2D communication keeps data traffic locally so as to avoid traffic overload at a base station and an Access Point (AP). For this reason, the standardization organizations, such as the 3$^{rd}$ Generation Partnership Project (3GPP) and the Institute of Electrical and Electronics Engineers (IEEE), are standardizing D2D communication based on the Long Term Evolution-Advanced (LTE-A) and Wi-Fi technologies, and many companies are developing D2D communication technologies independently.

In the D2D communication network, the terminals need to establish D2D links among each other autonomously without assistance of any base station or AP for data communications. In order to accomplish this, a distributed link scheduling method for determining radio resource and transmission timing on the plural D2D links influences the throughput of the D2D network significantly.

Recently, some network operators have proposed a distributed link scheduling method designed in consideration of a Signal-to-Noise Ratio (SNR) on the links through a single-tone search signal exchange based on an Orthogonal Frequency Division Multiplexing (OFDM) signal structure in the synchronized radio environment. This method determines the transmission on each link in consideration of a predicted signal interference amount instead of a carrier detecting result, and this makes it possible to support simultaneous transmission on the plural D2D links, resulting in improvement of D2D communication throughput.

However, this technology is optimized for the single communication and thus, limited in range of D2D communication as compared to the ad hoc technologies of the related art.

Therefore, a need exists for a method and apparatus for establishing two-hop links and scheduling the two-hop links for supporting two-hop link communication in a D2D communication network including radio communication terminals.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for establishing two-hop links and scheduling the two-hop links for supporting two-hop link communication in a Device-To-Device (D2D) communication network including radio communication terminals.

In accordance with an aspect of the present disclosure, a two-hop link transmission method of a transmission terminal in a wireless communication system is provided. The method includes identifying neighbor terminals available for communication with the transmission terminal, selecting one of the neighboring terminals as a recipient terminal, determining a type of a link to be established with the selected neighboring terminal between a single-hop link and two-hop link types, selecting, when the two-hop link type is determined, a relay terminal among the neighboring terminals, establishing the two-hop link with the recipient terminal via the relay terminal, allocating a Multi-Hop Connection Identifier (MCID) for the two-hop link, and transmitting data to the recipient terminal through the two hop link.

In accordance with another aspect of the present disclosure, a two-hop link transmission method of a relay terminal in a wireless communication system is provided. The method includes determining, when a relay request message is received from a transmission terminal attempting to transmit data to a recipient terminal, whether relay of the data is possible, establishing, when the data relay is possible, the two-hop link by transmitting a relay response message to the transmission terminal, and forwarding the data from the transmission terminal to the recipient terminal using at least one MCID allocated for the two-hop link.

In accordance with another aspect of the present disclosure, a two-hop link reception method of a recipient terminal in a wireless communication system is provided. The method includes identifying a relay terminal of the two hop link based on a relay response message transmitted by the relay terminal, which relays data transmission from a transmission terminal to the recipient terminal, determining, when a transmission request signal is received from the relay terminal at a signal strength equal to or greater than a certain level, whether data reception from the relay terminal is possible, transmitting, when the data reception from the relay terminal is possible, the transmission request signal to the relay terminal, and receiving the data transmitted by the relay terminal.

In accordance with another aspect of the present disclosure, a transmission terminal for performing two-hop transmission in a wireless communication system is provided. The terminal includes a transceiver configured to transmit and receive signals, and a control unit configured to control identifying neighbor terminals available for communication with the transmission terminal, selecting one of the neighboring terminals as a recipient terminal, determining a type of a link to be established with the selected neighboring terminal between a single-hop link and two-hop link types, selecting, when the two-hop link type is determined, a relay terminal among the neighboring terminals, establishing the two-hop link with the recipient terminal via the relay terminal, allocating an MCID for the two-hop link, and transmitting data to the recipient terminal through the two hop link.

In accordance with another aspect of the present disclosure, a relay terminal for relaying data on a two-hop link in a wireless communication system is provided. The terminal includes a transceiver configured to transmit and receive signals, and a control unit configured to control determining, when a relay request message is received from a transmission terminal attempting to transmit data to a recipient terminal, whether relay of the data is possible, establishing, when the data relay is possible, the two-hop link by transmitting a relay response message to the transmission terminal, and forwarding the data from the transmission terminal to the recipient terminal using at least one MCID allocated for the two-hop link.

In accordance with another aspect of the present disclosure, a recipient terminal for receiving data on a two-hop link in a wireless communication system is provided. The terminal includes a transceiver configured to transmit and receive signals, and a control unit configured to control identifying a relay terminal of the two hop link based on a relay response message transmitted by the relay terminal, which relays data transmission from a transmission terminal to the recipient terminal, determining, when a transmission request signal is received from the relay terminal at a signal strength equal to or greater than a certain level, whether data reception from the relay terminal is possible, transmitting, when the data reception from the relay terminal is possible, the transmission request signal to the relay terminal, and receiving the data transmitted by the relay terminal.

In accordance with another aspect of the present disclosure, a method for a transmission terminal to establish a two-hop link for data transmission to a recipient terminal via a relay terminal and determine an MCID as a link identifier is provided. The method includes generating a neighboring terminal list by search signals among the transmission, relay, and recipient terminals, establishing the two-hop link through a message exchange, and determining the MCID for identifying the two-hop link.

The terminals may determine whether to transmit the data on the link established between the transmission and recipient terminal via the relay terminal in a distributed manner in consideration of the signal interference.

Each terminal may broadcast a search signal including its identity information and receive the search signals transmitted to another terminal to generate a neighboring terminal list along with the received signal strength.

A transmission terminal attempting to transmit data determines to establish a two-hop link with the recipient terminal when the signal strength between the two terminals is equal to or less than a threshold value.

When establishing the two-hop link through a message exchange, a relay request message including the transmission and recipient terminals identifiers, a service type, and a communication time may be broadcast to search for the relay terminal to relay the data transmission from the transmission terminal to the recipient terminal.

When establishing the two hop ink through a message exchange, the terminal which has received the relay request message may determine whether the data relay is possible based on the neighboring terminal list and the information received in the relay request message and, when the data relay is possible, broadcast a relay response message.

When establishing the two-hop link through a message exchange, the recipient terminal which has received the relay response message including its identifier may transmit an acknowledgement message to the transmission terminal via the relay terminal.

When determining the MCID representing the two-hop link, a specific message including a CID available at each terminal may be transmitted.

At least one of the CIDs is available at all of the transmission, relay, and recipient terminals as an MCID.

In accordance with another aspect of the present disclosure, a method for transmitting and receiving data between the terminals connected through two-hop link in consideration of signal interference from other links by exchanging a transmission request and response message using MCID in the communication network supporting peer-to-peer communication provided. The method includes transmitting data from the transmission terminal to the relay terminal using an Orthogonal Frequency Division Multiplexing (OFDM) signal structure and an MCID for determining whether to perform transmission on multiple links in the traffic slot as a data transmission format repeating periodically, receiving, at the recipient terminal taking multiple roles, data transmitted by the transmission terminal using the OFDM signal structure and MCID, transmitting data from the relay terminal performing multiple roles to the recipient terminal using the OFDM signal structure and MCID, and receiving, at the recipient terminal the data transmitted by the relay terminal using the OFDM signal structure and MCID.

A method for identifying the transmission unit on which the transmission request signal is to be transmitted or received using at least one MCID in the OFDM signal structure (hereinafter, Tx OFDM block) defined for transmitting or receiving the transmission request signal at the transmission, relay and recipient terminals and a method for transmitting or receiving the transmission request signal on the identified transmission unit are included.

A method for identifying, at the recipient terminal, a transmission unit configured to transmit or receive the transmission response signal using at least one MCID in the OFDM signal structure (hereinafter, Rx OFDM block) defined for transmitting or receiving the transmission response signal and a method for transmitting or receiving the transmission response signal on the identified transmission unit are included.

A method for observing, at the transmission terminal when the two-hop link uses one MCID, to receive the transmission request signal from the relay terminal on the transmission unit corresponding to MCID in the Tx OFDM block and determine whether the recipient terminal is performing data transmission to the recipient terminal and a method for transmitting, when no transmission request signal is received from the relay terminal, data from the transmission terminal to the relay terminal are included.

The transmission, relay, and recipient terminals may transmit, when the two-hop link uses at least two MCIDs, signals according to a plural pattern on at least two transmission units corresponding to the MCIDs in the Tx and Rx OFDM blocks and transmit to another terminal the information on the transmission request, a transmission response, and a relay complete through the corresponding pattern.

A method for performing the task having the highest priority among a task of relaying on the two-hop link and the tasks of transmitting, receiving, and relaying on other links is further included.

A method for determining the media access probability and for executing a role on the link having the highest probability in the state of working as the relay terminal on the two-hop link and transmission terminal on another link and a method for observing, when the transmission unit corresponding to the MCID of the two-hop link and the transmission unit corresponding to the CID of another link are positioned at different OFDM symbols, the transmission unit corresponding to the MCID to detect the transmission request signal transmitted by the transmission terminal and transmitting the transmission request message on the transmission unit corresponding to the CID simultaneously are further included.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 is a diagram illustrating a neighboring terminal list for use in a link scheduling method according to an embodiment of the present disclosure;

FIG. 10 is a diagram illustrating a situation of transmitting a scheduling signal when two links use two MCIDs according to an embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The present disclosure is directed to a Device-To-Device (D2D) communication network in which adjacent devices communicate with each other directly without an infrastructure, such as a base station and an Access Point (AP).

Recently, a radio communication method capable of communicating with another terminal within a radius of 1 km (hereinafter, referred to as a 'single hop radio communication technology') has been proposed. The single hop radio communication technology is capable of allowing the terminals to use the restricted resources in a distributed fashion without assistance of the base station so as to establish and maintain a D2D network efficiently. In order to accomplish this, the single hop radio communication technology defines a function structure repeating periodically as shown in FIG. 1.

Figure 1:
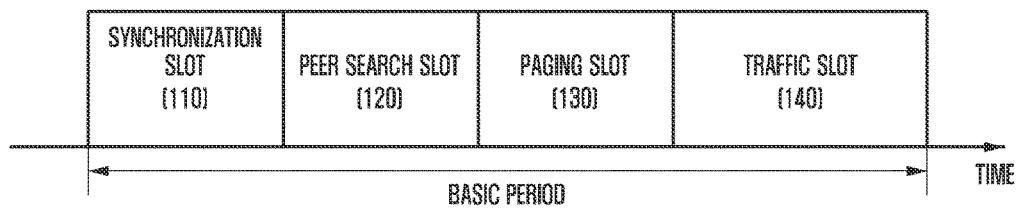
FIG. 1 is a diagram illustrating a basic functional structure of a single hop radio communication technology according to an embodiment of the present disclosure.

FIG. 1 is a diagram illustrating a basic functional structure of a single hop radio communication technology according to an embodiment of the present disclosure.

Referring to FIG. 1, the basic functional structure of the single hop radio communication technology has a period consisting of a synchronization slot 110, a peer search slot 120, a paging slot 130, and a traffic slot 140.

In the synchronization slot 110, the basic time and frequency synchronization operations among the terminals are performed using a Global Positioning System (GPS). In the peer search slot 120, each terminal identifies the neighboring terminals that are adjacent geometrically based on the device information broadcast by the individual terminals. In the paging slot 130, the terminals establish a D2D link for unidirectional transmission. The terminals connected through the D2D link established in the above process perform link scheduling and data transmission in the traffic slot 140.

In FIG. 1, the traffic slot 140 consists of plural traffic slots and the link scheduling and data transmission is performed in a unit of a traffic slot. The structure of the traffic slot 140 is depicted in FIG. 2.

Figure 2:
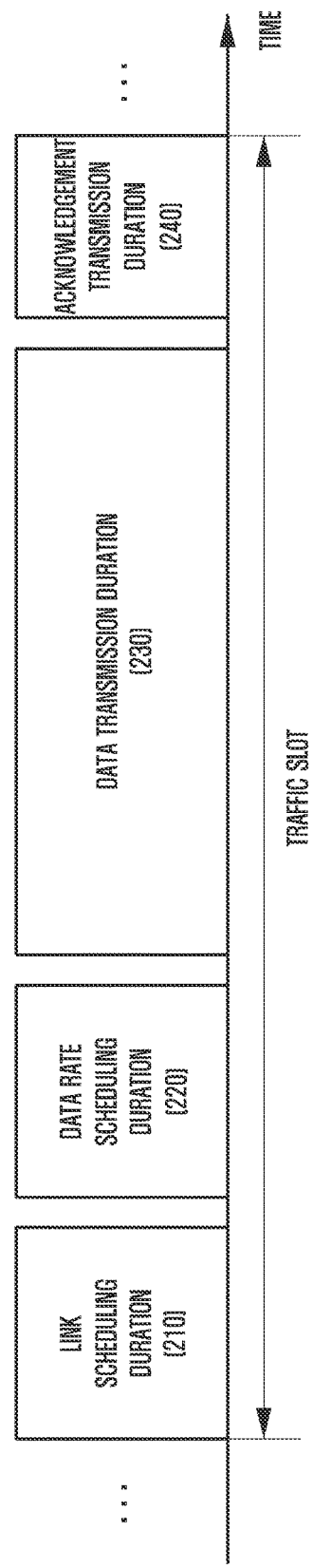
FIG. 2 is a diagram illustrating a structure of a traffic slot according to an embodiment of the present disclosure.

FIG. 2 is a diagram illustrating a structure of a traffic slot according to an embodiment of the present disclosure.

Referring to FIG. 2, the traffic slot 140 includes four functional durations, i.e., a link scheduling duration 210, a data rate scheduling duration 220, a data transmission duration 230, and an acknowledgement transmission duration 240. In the link scheduling duration 210, a single-tone search signal based on an Orthogonal Frequency Division Multiplexing (OFDM) signal structure is transmitted per D2D link for unidirectional communication to measure a signal interference relationship between links and to determine whether data transmission is available at the corresponding traffic slot. In the data rate scheduling duration 220, the data rates on the links selected for data transmission are adjusted. The transmission terminals transmit data to the peer recipient terminals in the data transmission duration 230, and the acknowledgement messages corresponding to the data are transmitted in the acknowledgement transmission duration 240.

The single hop radio communication technology defines the OFDM signal structure characterized by the orthogonal radio resources on the time-frequency plane for link scheduling, i.e., determining the use of the links, of the single hop unidirectional D2D links in the link scheduling duration 210 of FIG. 2 and transmits single-tone search signals to the plural D2D terminals simultaneously without interference to each other. Each terminal calculates a Signal-to-Interference Ratio (SIR) on its own and neighboring D2D links and performs scheduling based on the SIR.

CID-Based Link Priority Allocation

A number of D2D links capable of using the same radio resource at a certain time is limited by nature of the radio resource. For this reason, in the legacy centralized radio communication technology like cellular communication, a central controller, such as a base station, controls the terminals' radio resource use. In the D2D communication in which each terminal has to perform the link scheduling in a distributed manner, however, a method for restricting the occupancy of a radio resource of a link in consideration of signal interference is needed.

In order to accomplish this, the single hop radio communication technology allocates a Connection Identifier (CID) unique per link locally and assigns a priority to the link at every traffic slot based on the CID. The terminal determines whether to perform communication in the current traffic slot in consideration of SIRs of its own and other links assigned a high priority. In order to guarantee fairness among the links, the priority is changed equally at every traffic slot based on the hash or a Pseudo Noise (PN) code.

OFDM Signal Structure-Based Single-Tone Search Signal

In order to perform the link scheduling in consideration of SIRs of its own and other links having a high priority, the terminals that established the links have shared the channel states with a neighboring transmitter and recipient terminals. For this purpose, the single hope radio communication technology defines a single-tone search signal transmission method based on the OFDM signal structure (block) as shown in FIG. 3.

Figure 3:
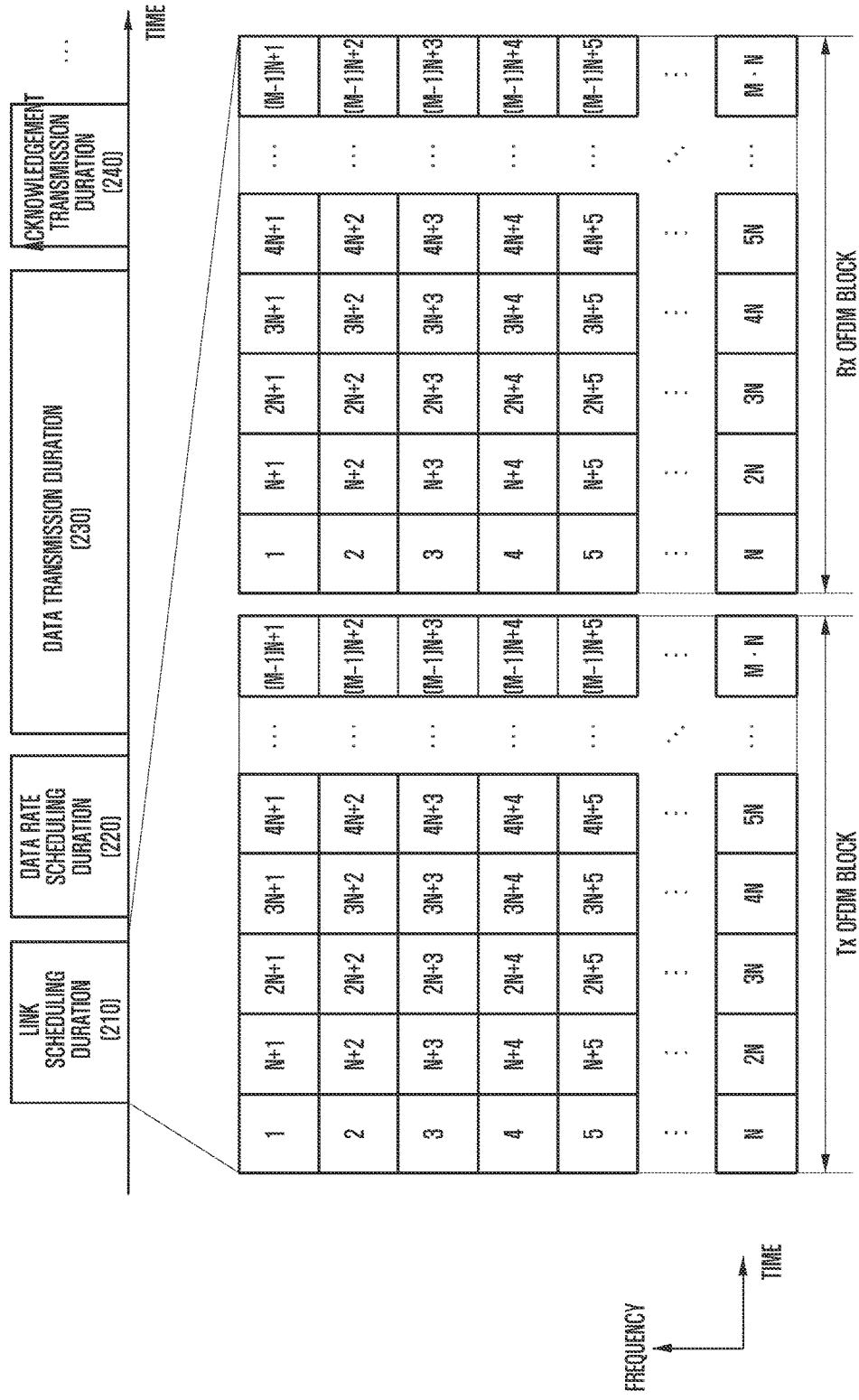
FIG. 3 is a diagram illustrating a structure of a link scheduling duration for use in a single hop radio communication technology according to an embodiment of the present disclosure.

FIG. 3 is a diagram illustrating a structure of a link scheduling duration for use in a single hop radio communication technology according to an embodiment of the present disclosure.

Referring to FIG. 3, the link scheduling duration 210 consists of a Tx OFDM block (or a transmission block) for the transmission terminals and an Rx OFDM block (or a reception block) for the recipient terminal. Each OFDM block consists of N subcarriers in the frequency domain and M OFDM symbols in the time domain, resulting in total N*M transmission units.

As shown in FIG. 3, N*M transmission units are allocated priorities of 1 to N*M in the orders of top to bottom and left to right directions, and each link uses the resource unit matching its own priority to transmit/receive single-tone search signal. Here, the value 1 indicates the highest priority, and the value N*M indicates the lowest priority.

The single-tone signal denotes the tone signal corresponding to one subcarrier in the frequency domain. The corresponding signal occupies a narrow frequency bandwidth so as to be transmitted at a high power level as compared to the multi-tone signal. In the single hop radio communication technology, such a single-tone signal is used to secure extended communication area of 1 km radius.

SIR-Based Link Scheduling

The D2D link scheduling method based on the unique priority allocated locally is performed as follows.

The transmission terminal having the data to be transmitted to the peer recipient terminal transmits a single-tone signal on the transmission unit corresponding to its own link priority in the Tx OFDM block. The recipient terminal monitors the corresponding transmission unit at every traffic slot for receiving the data. If the single-tone signal is received from the transmission terminal, the recipient terminal compares the interference signal strengths from the links having higher priorities with the signal strength from the peer transmission terminal to determine whether the communication over the corresponding link is possible.

If it is determined that the communication over the corresponding link is possible, the recipient terminal transmits the single-tone signal at the corresponding transmission unit in the Rx OFDM block. After receiving the single-ton signals from the peer recipient terminal and other recipient terminals having higher priorities, if it is determined that its signal interference to the recipient terminals having the higher priorities is equal to or less than a certain level, the transmission terminal determines to continue communication on the corresponding link.

The link scheduling according to an embodiment of the present disclosure is described with reference to FIG. 4.

Figure 4:
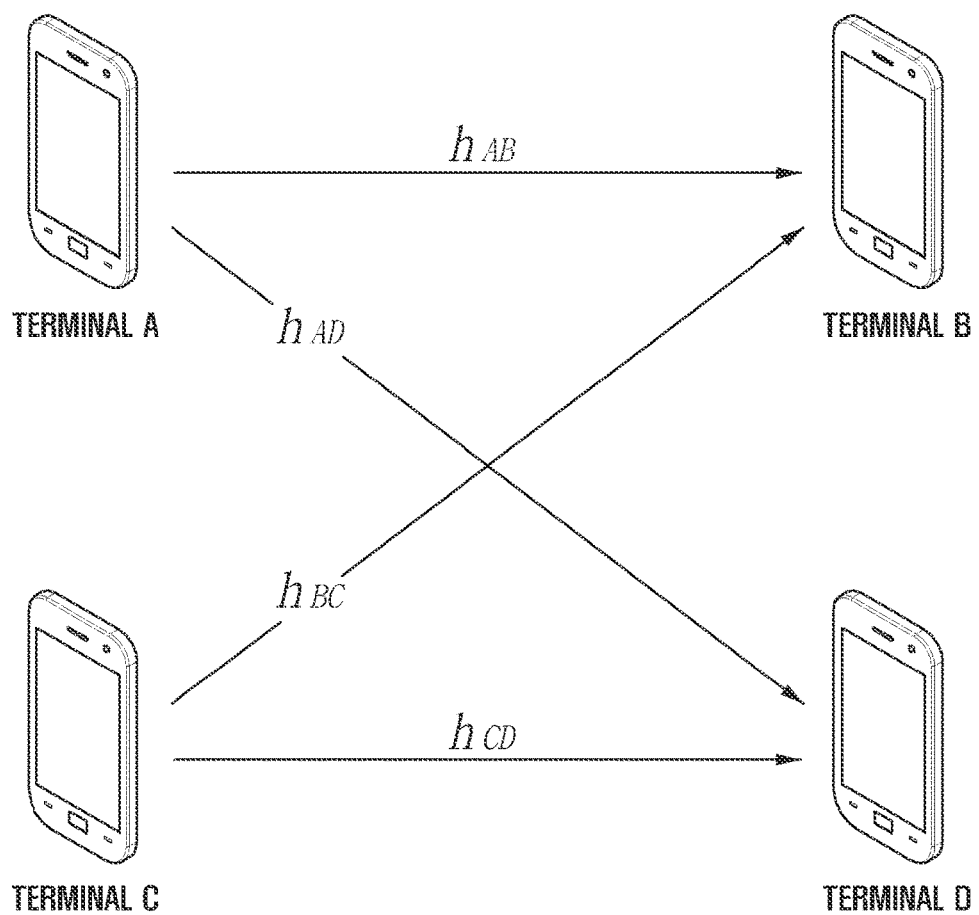
FIG. 4 is a diagram illustrating a principle of a link scheduling method according to an embodiment of the present disclosure.

FIG. 4 is a diagram illustrating a principle of a link scheduling method according to an embodiment of the present disclosure.

Referring to FIG. 4 is directed to a procedure of scheduling the link for transmitting data from the terminal C to the terminal D in the D2D communication network having two links. Here, it is assumed that the terminal A has the data to be transmitted to the terminal B (link 1), and the terminal C has the data to be transmitted to the terminal D (link 2). Here, $h_{XY}$ denotes the channel gain between two terminals X and Y.

In the Tx OFDM block, the terminals A and C transmit the single-tone signals (i.e., a Direct Power Signal (DPS)) at the transmission powers $P_A$ and $P_C$ respectively on the transmission units corresponding to their priorities. The recipient terminal D calculates a predictive Signal-to-Interference Ratio ($SIR_{link\_2}$) of link 2 by taking notice of the signal interference from the links having higher priorities based on the signal strength of DSP ($P_C \cdot |h_{CD}|^2$ [Watt]) received from the peer terminal (terminal C) using Equation 1:

$$SIR_{link\_2} = \frac{P_C \cdot |h_{CD}|^2}{P_A \cdot |h_{AD}|^2} \qquad \text{Equation 1}$$

If $SIR_{link\_2}$ is less than a certain threshold ($\gamma_{Rx}$), the terminal D determines that the communication over link 2 is impossible due to the strong interference from the transmission terminals having higher priorities (Rx yielding). Otherwise, If $SIR_{link\_2}$ is equal to or greater than a certain threshold ($\gamma_{Rx}$), the terminal D determines that the communication over link 2 is possible.

If it is determined that the communication is possible, the terminals D and B transmits a single-tone signal called an Inverse Power Echo (IPE) at the transmission power defined by Equation 2 on the transmission unit corresponding to the priority of links 2 and 1.

$$P_{IPE} = \frac{K}{P_{Tx} \cdot |h_{Tx,Rx}|^2} \qquad \text{Equation 2}$$

Here, K denotes a constant defined in the system, $P_{TX}$ denotes the transmission power of the peer transmission terminal, and $h_{TX, Rx}$ denotes the channel gain between the two terminals. In this embodiment, the strengths of IPE signals transmitted by the terminals B and D are $K/(P_A \cdot |h_{AB}|^2)$ [Watt] and $K/(P_C|h_{CD}|^2)$, respectively. If the IPE signal is received from the terminal D on the transmission unit of link 2, the terminal C determines whether the SIR influence ($SIR_{link\_1}$) to the communication over link 1 having the higher priority, which is predicted based on the strength of the IPE signal received from the terminal B (($K|h_{BC}|^2)/(PA|h_{AB}|^2)$ [Watt]), fulfills the condition of inequality (3):

$$SIR_{link\_1} = \left(\frac{K \cdot |h_{BC}|^2}{P_A \cdot |h_{AB}|^2}\right)^{-1} \cdot \frac{K}{P_C} = \frac{P_A \cdot |h_{AB}|^2}{P_C \cdot |h_{BC}|^2} > \gamma_{Tx} \qquad \text{Equation 3}$$

If the condition of inequality (3) is fulfilled, the transmission terminal transmits the pilot signal in the subsequent data rate scheduling duration to initiate transmission on link 2. Otherwise, if the calculated $SIR_{link\_1}$ is less than the threshold value $\gamma_{Tx}$, the transmission terminal determines that its data transmission influences the SIR of link 1 and abandons transmission on link 2 (Tx yielding).

In the single hop radio communication technology, each terminal broadcasts a single-tone signal to notify the neighboring terminals of its presence. Accordingly, the neighboring terminals located within the single-tone signal transmission range receive the signal to identify the terminals and establish a link therewith.

In the traffic slot 140, the terminal transmits the data through the multi-tone signal using all the subcarriers across the entire bandwidth other than a single-tone subcarrier. Since the multi-tone transmission signal is transmitted at the signal strength equal to that acquired by dividing the single-ton signal transmission power by the number of subcarriers, the transmission range is small as compared to the single tone signal transmission range.

In the single hop radio communication technology, although the neighboring terminals have been identified by transmitting the single-tone signal and the links have been established, the data transmission may not be performed normally due to the low multi-tone signal strength.

In order to overcome this issue of the signal hop signal transmission, the two-hop communication can be considered. In a case where it is difficult to transmit the multi-tone data signal between a pair of terminals identifying each other through the single-tone signal transmission, a third terminal may relay the data transmission between the two terminals. However, since the single hop radio communication technology specifies no link establishment and link scheduling method for two-hop communication, there is a need of a novel technology to resolve this issue.

As a method for performing two-hop communication based on the single-hop radio communication technology, it can be considered to use two links. It is possible to establish two single-hop links forming two-hop transmission path based on the single-hop radio communication technology and allow a higher network protocol responsible for data transmission between the terminals to manage the single-hop links so as to perform two-hop communication. In this case, however, the involvement of the extra network protocol increases the two-hop link management complexity and decreases the number of available CIDs due to the use of two CIDs per two-hop communication. More particularly in the single hop radio communication technology, the number of CIDs available in a certain geographic area is limited to L (e.g., 112), if the multiple two-hop communication links are allocated 2 CIDs respectively, the number of direct links available in the corresponding area is limited.

The present disclosure aims to provide a two-hop link establishment method and a link scheduling technology thereof for supporting two-hop link communication in the D2D communication network including plural radio communication devices.

The present disclosure aims to make it possible for all terminals to exchange neighboring terminal lists and to perform two-hop communication with low complexity and overhead as compared to the ad hoc technology supporting multi-hop communication. The present disclosure is also capable of overcoming the communication area issue occurring with the single hop-only communication, supporting backward compatibility to the legacy terminal, and uses the local reuse-restricted CIDs efficiently.

The present disclosure is applicable to the radio communication terminal device capable of D2D communication. In the D2D communication environment, the two-hop link is established with a transmission terminal for generating and transmitting data initially, a recipient data for receiving the data and a relay terminal for relaying the data between the transmission and recipient terminals, and the present disclosure defines the roles of the respective transmission, recipient, and relay terminals in association with the two-hop link establishment and data transmission.

The two-hop D2D communication method includes 1) a procedure of establishing a two-hop link through a terminal search and a message exchange and allocating a multi-hop Connection Identifier for managing the link and 2) a procedure of transmitting the data from the transmission terminal to the recipient terminal via the relay terminal through the established two-hop link.

The procedure of transmitting the data can be classified into one of a method using one Multi-Hop CID (MCID) and a method using multiple MCIDs according to the channel condition, available number of MCIDs, and a service type.

In addition, the present disclosure proposes a method for the relay terminal to work as another transmission terminal or a recipient terminal simultaneously.

In the D2D communication network environment, the procedure of establishing the two-hop link with the transmission, relay, and recipient terminals for performing the two-hop communication and allocating the MCID for the two-hop link is implemented as follows.

First, the two-hop link establishment procedure is divided into 1) a neighboring terminal identification process for identifying a neighboring terminal to communicate, 2) a link type determination process for selecting a target terminal and for determining the type of communication link to be established, 3) a delay availability determination process for selecting a relay terminal and for determining the availability of a relay, and 4) a two-hop link establishment process for completing the establishment of the two-hop link via the selected relay terminal.

FIG. 5 is a diagram illustrating a neighboring terminal list for use in a link scheduling method according to an embodiment of the present disclosure.

Referring to FIG. 5, in the neighboring terminal identification process, each of the terminals broadcasts a device search signal including its own identity information in the device search duration to identify the neighboring terminals. Each terminal generates a neighboring terminal list based on the received terminal search signal as shown in FIG. 5. The neighboring terminal list may include columns of a terminal identifier and a received signal strength. The transmission terminal determines the presence or absence of the recipient terminal to which the data is to be transmitted based on the neighboring terminal list.

If there is the recipient terminal in the neighboring terminal list, the transmission terminal determines the type of the link to be established for data transmission based on the received signal strength $P_r$ [Watt] from the neighboring terminal. At this time, the terminal determines to establish a single-hop link for the case where $P_r$ is greater than the threshold value $T_a$, a two-hop link for the case where $P_r$ is less than the threshold value $T_a$ and greater than the threshold $T_b$, and no link for the case where $P_r$ is less than the threshold value $T_a$. Here, $T_a$ [Watt] and $T_b$ [Watt] are determined by adding a certain margin value to the minimum signal strengths used for single-hop and two-hop communications and have the relationship of $T_a > T_b$.

If it is determined to establish a two-hop link, the transmission terminal determines whether the relay communication is possible. The transmission terminal broadcasts a relay request message including information on its own and recipient terminal identifiers, a type of serving for data transmission, a relay time, and the like. If the relay request message is received, the neighboring terminal determines whether it can serve the relay communication for the corresponding time duration and whether the following conditions are fulfilled based on the neighboring terminal list.

$$P_{TX} > T_c \qquad \text{Equation 4}$$

$$P_{RX} > T_c \qquad \text{Equation 5}$$

$$|P_{TX} - P_{RX}| < T_d \qquad \text{Equation 6}$$

Here, $P_{Tx}$ and $P_{Rx}$ denote the signal strengths [Watt] from the transmission and recipient terminals included in the relay request message, $T_c$ and $T_d$ denote threshold values [Watt] to determine whether the candidate relay terminals receive the signals stronger than certain level from the transmission and recipient terminals and whether the corresponding terminal is positioned between the transmission and recipient terminals.

The terminal fulfilling the above conditions broadcasts a relay request accept message informing that it can work as the relay terminal. At this time, the transmission and recipient terminal selects the terminal which has transmitted the relay request accept message first as the relay terminal, and the neighboring terminals which have received the relay request accept message terminate the determination on whether they can relay. If the relay terminal is selected, the recipient sends the transmission terminal an acknowledgement message notifying that it operates as the recipient through the two-hop link via the relay terminal, and the two hop link establishment completes at the time when the acknowledgement message is received by the transmission terminal.

Figure 6:
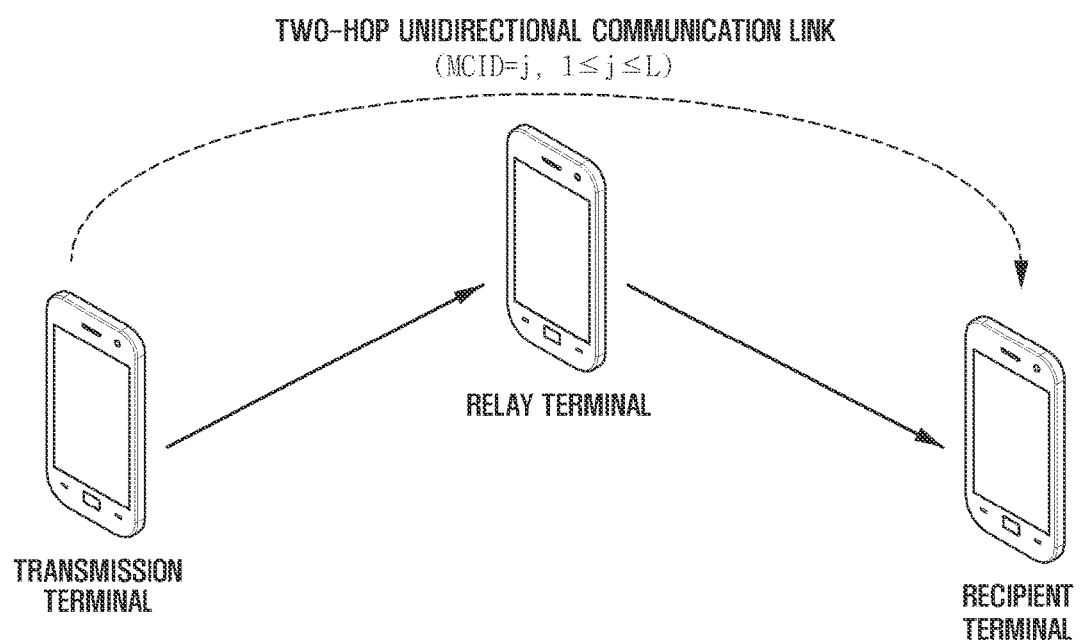
FIG. 6 is a diagram illustrating a basic structure of a two-hop link established in a link scheduling method according to an embodiment of the present disclosure.

FIG. 6 is a diagram illustrating a basic structure of a two-hop link established in a link scheduling method according to an embodiment of the present disclosure. The basic configuration of the two-hop link established through the above procedure is depicted in FIG. 6.

Referring to FIG. 6, the two-hop link is managed with a locally unique MCID. The MCID is the identifier for use in identifying the brand of the terminals establishing the two-hop link and determining the presence of media access and has a value between 1 and L. Here, L denotes the number of transmission units constituting the OFDM block depicted in FIG. 3.

The two-hop link MCID determination procedure is performed as follows.

The transmission, relay, and recipient terminals establishing the two-hop link observe the CID information included in the single-tone signal broadcast by the terminals established the previous links periodically. The terminals determine the CIDs received at the signal strength below a certain level from the respective view points of the three terminals based on the observation result and select at least one of the CIDs as MCID of the two-hop link. The two-hop link may be assigned one or more MCIDs according to the importance of the service using the corresponding link, and the greater the number of allocated MCIDs, the greater the chances to access the media.

The MCID allocation procedure based on two-hop link establishment is performed as follows.

First, the transmission terminal transmits a relay request message including the list of CIDs that are not used around it. If the list is received, the candidate relay terminal generates a list of the CIDs matching between the CID list received in the relay request message and its own available CID list and transmits a relay response message including the matching CID list.

Thereafter, the recipient terminal compares the matching CID list contained in the relay response message received form the candidate relay terminal and its own available CID list to determine the MCID to be used finally. The recipient terminal transmits an acknowledgement message including the information on the selected MCID.

The acknowledgement message including the selected MCID is transmitted to the transmission terminal via the relay terminal such that the transmission, relay, and recipient terminals are allocated unique MCID for the two-hop link.

Meanwhile, the link scheduling method (i.e., a data transmission method) on the two-hop link is classified into one of 1) the data transmission method using a single MCID and 2) the data transmission method using multiple MCIDs simultaneously.

First, a description is made of the method for transmitting data using the single MCID.

The single MCID-based data transmission method is the method of exchanging the transmission request and response signals among the transmission, relay, and recipient terminals using one transmission unit determined by MCID in the Tx or Rx OFDM block.

The basic operation procedure of the transmission terminal according to an embodiment of the present disclosure is described hereinafter. The transmission terminal having the data to be transmitted to the recipient terminal operates as shown in FIG. 7.

Figure 7:
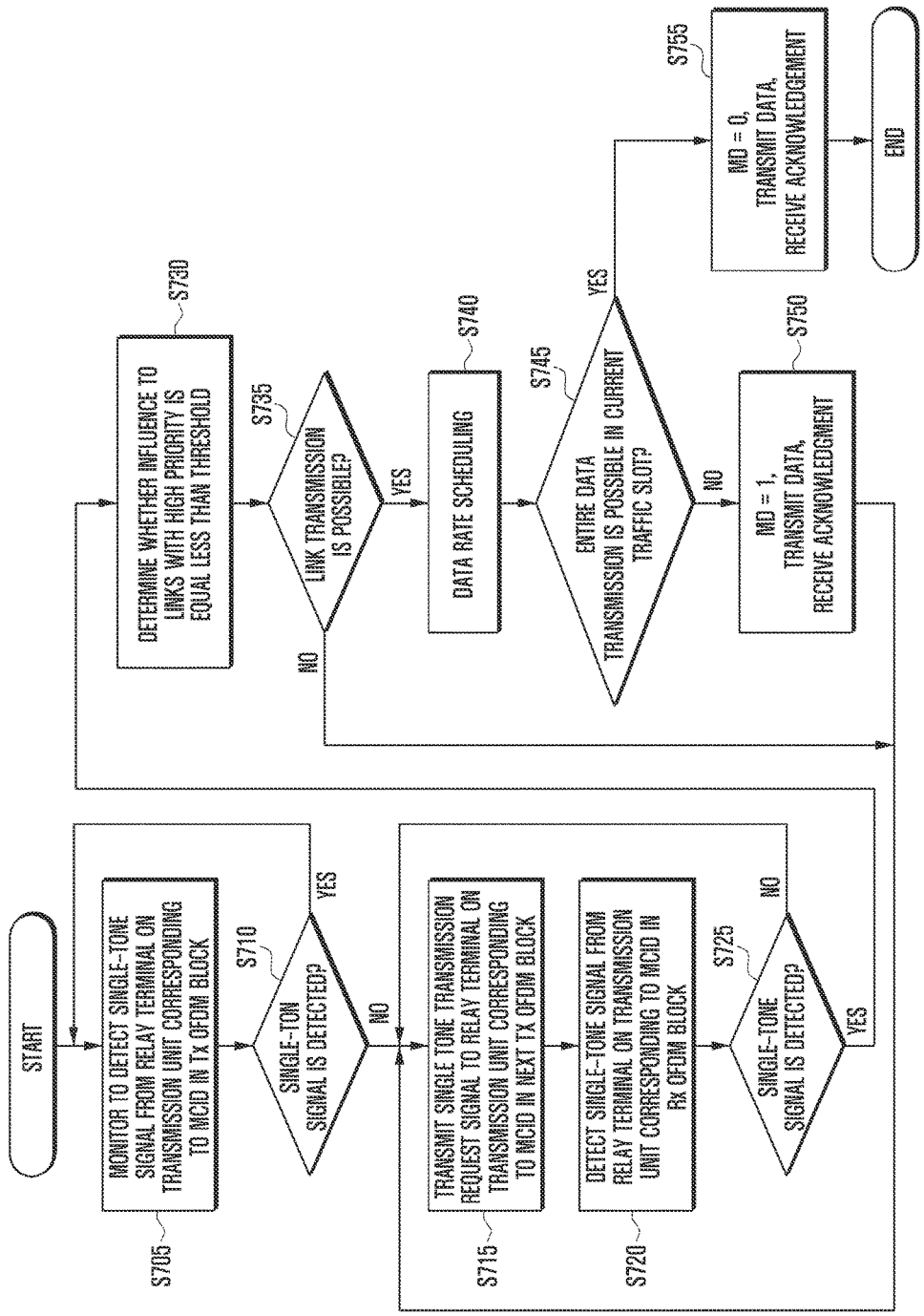
FIG. 7 is a flowchart illustrating an operation procedure of a transmission terminal according to an embodiment of the present disclosure.

FIG. 7 is a flowchart illustrating an operation procedure of a transmission terminal according to an embodiment of the present disclosure.

Referring to FIG. 7, the transmission terminal observes the transmission unit corresponding to the MCID in the Tx OFDM block at operation S705. The transmission terminal determines whether a single tone signal is detected, i.e., when the current relay terminal is attempting relay data transmission to the recipient terminal, at operation S710.

If a transmission request signal having the signal strength equal to or greater than $T_a$ [Watt] is detected at the corresponding transmission unit, the transmission terminal determines that the relay terminal is attempting data transmission with MCID and returns the procedure to operation S705 to observe the Tx OFDM block in the next traffic slot.

If no transmission request signal is detected at the corresponding transmission unit, the transmission terminal determines that the relay terminal has no relay data to be transmitted to the recipient terminal and transmits the transmission request signal at the transmission unit corresponding to the MCID in the next Tx OFDM block at operation S715.

After transmitting the transmission request to the relay terminal, the transmission terminal observes the transmission unit corresponding to the MCID of the subsequent Rx OFDM block at operation S720. As the observation result, if no transmission response signal is detected at the corresponding transmission unit at operation S725, the transmission terminal retransmits the transmission request signal in the next traffic slot at operation S715.

Otherwise, if it is determined at operation S725 that the transmission response signal is detected at the corresponding transmission unit, the transmission terminal determines at operation S730 whether the condition of inequality (3) is fulfilled based on the strength of the single-tone signals received on the links (single-hop and two-hop) having the priority higher than that of its two-hop link and performs the link scheduling based on the determination result. Thereafter, the transmission terminal determines at operation S735 whether link transmission is possible.

If the condition of inequality (3) is not fulfilled and if it is determined at operation S735 that link transmission is not possible, the transmission terminal returns the procedure to operation S715 to retransmit the data to the relay terminal in the next traffic slot. Otherwise, if the condition of inequality (3) is fulfilled and if it is determined at operation S735 that link transmission is possible, the transmission terminal performs data rate scheduling at operation S740. For example, the transmission terminal determines that the data transmission is possible in the current traffic slot and determines the data rate to be applied for actual data transmission by exchanging pilot signal and channel quality index report (data rate scheduling).

Thereafter, the transmission terminal determines, at operation S745, whether entire data can be transmitted in the current traffic slot based on the data amount to transmit, the length of data transmission duration, and the negotiated data rate.

If it is impossible to transmit entire data in the current traffic slot, the transmission terminal sets the More Data (MD) bit of the data header to 1 to notify the recipient terminal that there is further data to be transmitted in the next traffic slot and transmits the corresponding data to the relay terminal at operation S750. Thereafter, the transmission terminal receives the acknowledgement from the relay terminal and attempts transmission of the remaining data in the next traffic slot.

Otherwise, if entire data can be transmitted in the current traffic slot or the number of relay data transmission times reaches the limit threshold (K), the transmission terminal sets the MD bit to 0 and transmits the data at operation S755. Thereafter, the transmission terminal receives the acknowledgement from the relay terminal and terminates the relay data transmission procedure.

Figure 8:
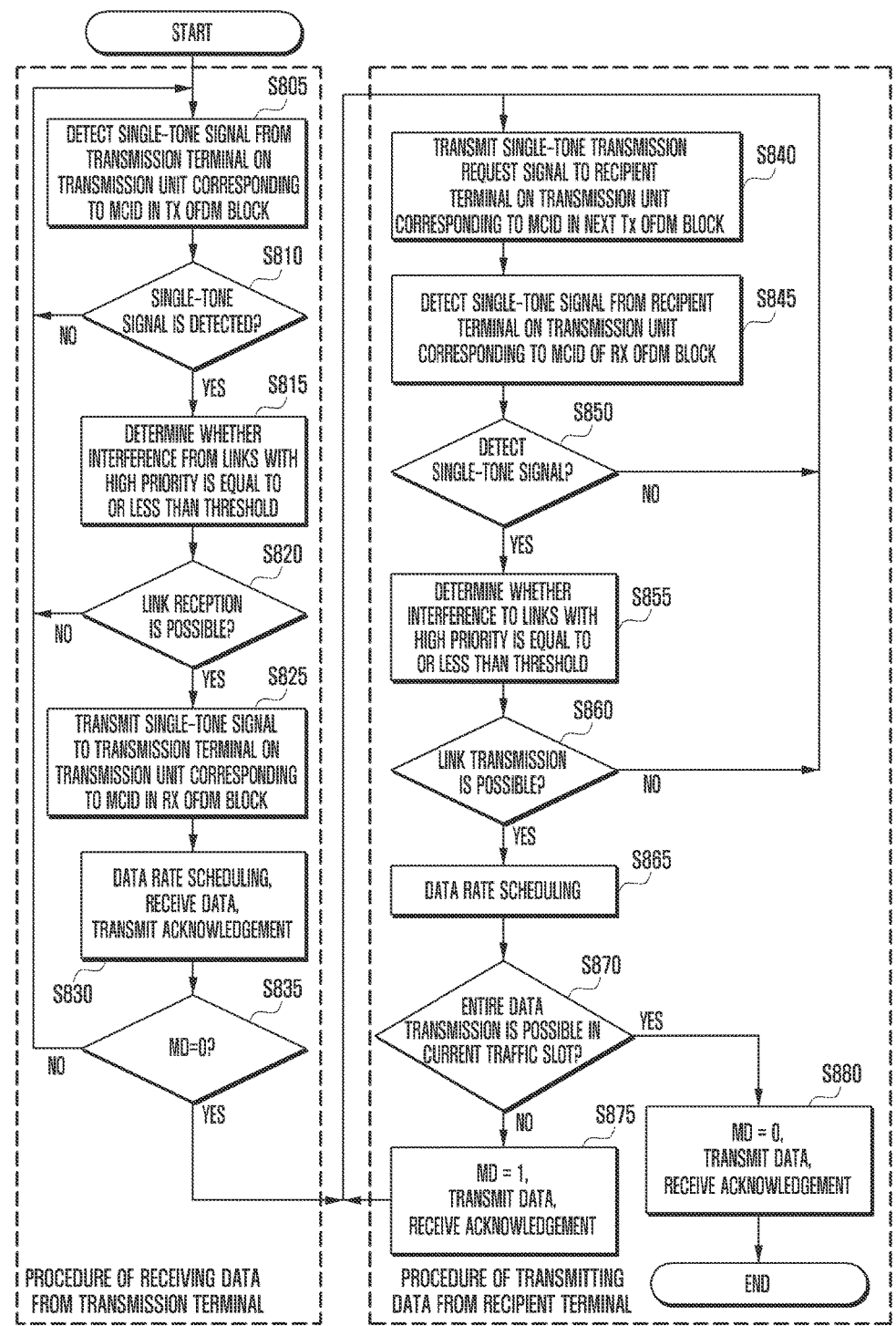
FIG. 8 is a flowchart illustrating an operation procedure of a relay terminal in a single Multi-Hop Connection Identifier (MCID)-based link scheduling method according to an embodiment of the present disclosure.

FIG. 8 is a flowchart illustrating an operation procedure of a relay terminal in a single MCID-based link scheduling method according to an embodiment of the present disclosure.

Referring to FIG. 8, the relay terminal in the state of not relaying data currently performs the procedure of FIG. 8 to receive the data transmitted by the transmission terminal and forwards the data to the recipient terminal.

First, the relay terminal observes the transmission unit corresponding to the MCID in ever Tx OFDM block at operation S805. At operation S810, the relay terminal determines if a single-tone signal is detected. If it is determined at operation S810 that a transmission request signal is received at a power level equal to or greater than $T_a$ [Watt] at the corresponding transmission unit, the relay terminal compares the corresponding signal strength with the signal interference strengths on the links having the high priorities at operation S815 to determine whether the link transmission is possible at operation S820.

If it is determined at operation S820 that the link transmission is possible, the relay terminal transmits a transmission response message at the transmission unit corresponding to MCID in the Rx OFDM block in response to the transmission request message at operation S825. Thereafter, the relay terminal performs a transmission rate scheduling, a data reception, and an acknowledgement transmission with the transmission terminal at operation S830.

At operation S835, it is determined if the MD bit of the received data is set to zero. If it is determined at operation S835 that the MD bit of the received data is not set to zero, the relay terminal returns the procedure to operation S805 to monitor the Tx OFDM block to receive further data from the transmission terminal. Otherwise, if the MD bit of the received data is set to 0, the relay terminal transmits the transmission request signal at the transmission unit corresponding to MCID in the next Tx OFDM block to deliver the data to the recipient terminal at operation S840.

If a transmission response signal transmitted by the recipient terminal is detected in the subsequent Rx OFDM block at operations S845 and S850, the relay terminal determines whether the condition of inequality (3) is fulfilled in comparison with the links having the higher priorities at operation S855. If the condition of inequality (3) is fulfilled, the relay terminal transmits the data to the recipient terminal through data scheduling at operations S860 and S865.

The relay terminal determines whether the entire data can be transmitted in the current traffic slot at operation S870. If it is possible to transmit the entire data in the current traffic slot, the relay terminal transmits the data with the MD bit set to 0 at operation S880 and, otherwise, if it is impossible to transmit the entire data in the current traffic slot, the relay terminal transmits the data with the MD bit set to 1 at operation S875.

Thereafter, the relay terminal returns the procedure to operation S840 to send the recipient terminal the transmission request signal at the transmission unit corresponding to MCID in the Tx OFDM block of every traffic slot until the entire data from the transmission terminal are delivered to the recipient terminal.

Figure 9:
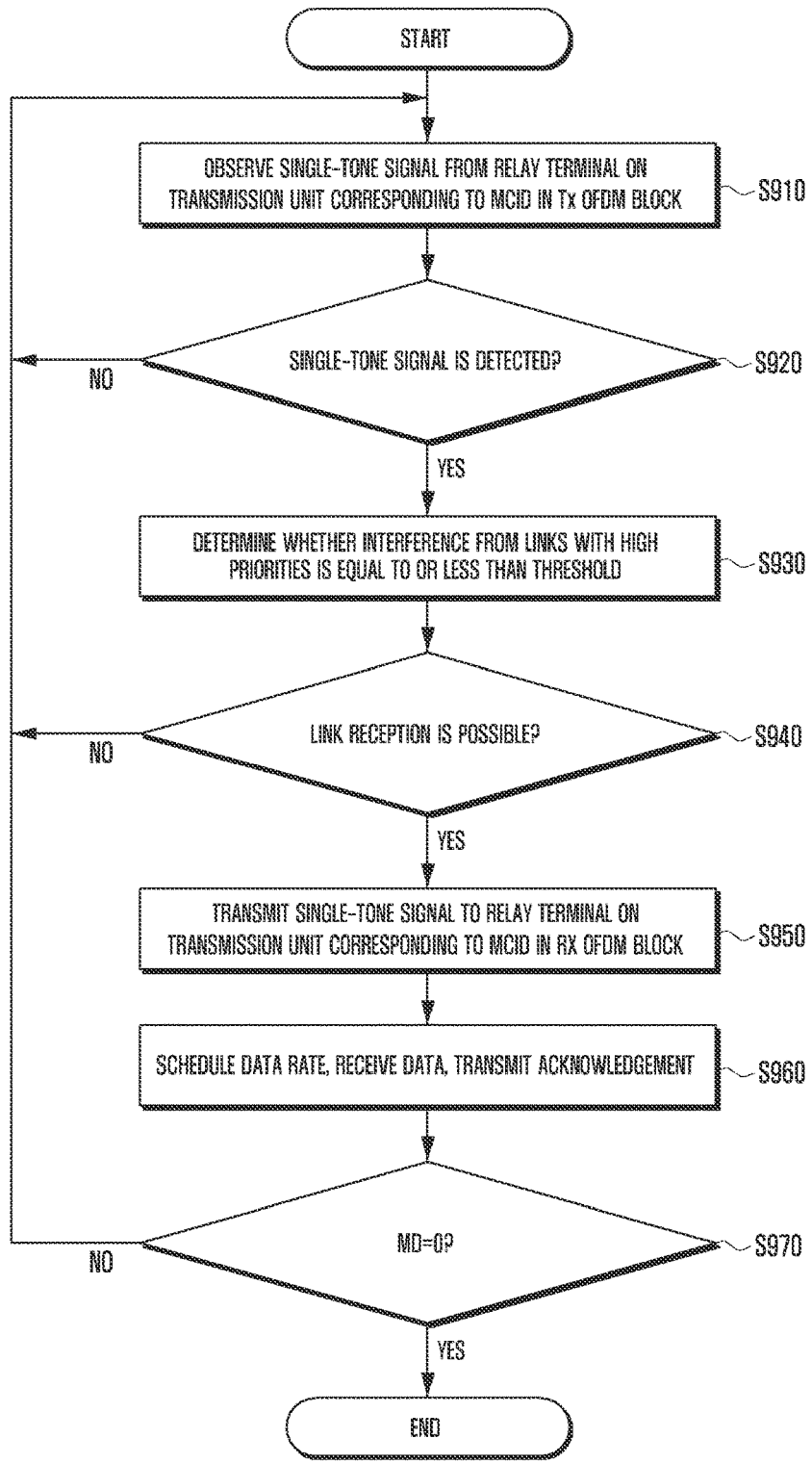
FIG. 9 is a flowchart illustrating an operation procedure of a recipient terminal in a single MCID-based link scheduling method according to an embodiment of the present disclosure.

FIG. 9 is a flowchart illustrating an operation procedure of a recipient terminal in a single MCID-based link scheduling method according to an embodiment of the present disclosure.

Referring to FIG. 9, the recipient terminal observes the transmission unit corresponding to MCID in the Tx OFDM block of every traffic slot at operation S910 and determines whether a single tone signal is detected at operation S920.

If the detected transmission request signal strength is less than Ta [Watt], this signal is regarded as the signal from the transmission terminal so as to be ignored, and the recipient terminal returns the procedure to operation S910. Otherwise, if the detected transmission request signal strength is equal to or greater than Ta [Watt], the recipient terminal compares the strength of the corresponding signal and the interference signal strengths on the links having high priorities to determine whether the data signal from the relay terminal can guarantee an SIR higher than a certain threshold at operation S930.

If it is determined that the link reception is not possible at operation S940, the recipient terminal returns the procedure to operation S910 to perform the above process in the next traffic slot. Otherwise, if it is determined that the link reception is possible, the recipient terminal transmits a transmission response signal on the transmission unit corresponding to MCID in the Rx OFDM block at operation S950.

Thereafter, the recipient terminal receives the pilot signal from the relay terminal in the subsequent data rate scheduling duration, transmits a channel quality indication report to determine the transmission rate on the corresponding link, and receives the data at operation S960. If the data reception has completed, the recipient terminal sends the transmission terminal the acknowledgement.

The recipient terminal determines whether the MD bit in the received data is set to 0 or 1 at operation S970. If the MD bit of the received data is set to 1, the recipient terminal returns the procedure to operation S910 to receive more data and repeats the above process in the next traffic slot. Otherwise, if the MD bit is set to 0, the recipient terminal determines that the entire data transmitted by the transmission terminal has been received completely and terminates the procedure.

The single MCID-based link scheduling method uses the limited CID resource efficiently so as to make it possible to use more links simultaneously. In the legacy technology, the number of CIDs that can be used simultaneously in a specific area is limited to M*n as the number of transmission units constituting one OFDM block. If two single-hop links are used for two-hop communication, M*N/2 two-hop links can be used simultaneously. In the present disclosure, however, the two-hop link uses one MCID and thus, the total M*N two-hop links may exist simultaneously.

In the frequency selective radio channel environment, if the scheduling signals (i.e., transmission request and response signals) are exchanged using the single transmission units, this may cause an erroneous scheduling operation. For example, the strength of the transmission request signal transmitted by the relay terminal on a specific transmission unit corresponding to an MCID in the Tx OFDM block decreases by the influence of the radio channel, the recipient terminal determines that the corresponding signal is transmitted from the transmission terminal and ignores the corresponding signal through the process like operation S920 of FIG. 9. In order to reduce such malfunctioning, the present disclosure proposes a link scheduling method in which one two-hop link uses multiple MCIDs.

In the multi-MCID-based link scheduling method, the basic operations of the transmission, relay, and recipient terminals are identical with those in the procedures of FIGS. 7, 8, and 9 with the exception of the transmission request and response signals transmission method.

FIG. 10 is a diagram illustrating a situation of transmitting a scheduling signal when two links use two MCIDs according to an embodiment of the present disclosure.

Referring to FIG. 10, in the Tx and Rx OFDM blocks of each traffic slot, two transmission units corresponding to MCIDs are determined: one having a high priority and the other having a low priority. Each terminal transmits the signal on the corresponding transmission unit in accordance with its purpose and usage as shown in FIG. 10. The terminal determines the presence or absence on the corresponding transmission unit and determines the meaning of the corresponding signal.

The link scheduling method based on multiple MCIDs allows the two-hop link allocated the corresponding MCIDs to acquire a higher transmission priority. Since the two-hop link's media access is determined based on the transmission unit having the highest priority among the transmission units determined by the MCIDs, the two-hop link with multiple CIDs has the more media access changes as compared to the two-hop link with single MCID. The link scheduling method has the scheduling error occurrence probability as compared to the single MCID-based scheduling method. For example, unlink the operation of the recipient terminal in the single MCID-scheduling method in which the transmitter of the transmission request signal is determined based on the signal strength may make a wrong decision according to the variation of the channel influence, the method proposed in the present disclosure in which the transmitter of the corresponding signal is determined based on the presence or absence of the signal transmission on each transmission unit has a less error occurrence probability. However, the link scheduling method based on multiple MCIDs needing more CIDs per link has a drawback in that the number of links capable of being used simultaneously is reduced.

The number of MCIDs for the two-hop link is determined depending on the number of available CIDs, a channel influence degree, and a type of service transmitted on the two-hop link. In order to avoid limiting the generation of a new link, the two-hop link-capable terminals may use plural MCIDs when the number of CIDs available in the corresponding area is greater than a threshold J. In addition, when the service using the two-hop link needs a high data rate or a low delay, it can be considered to allocate multiple MCIDs for the corresponding two-hop link. In order to reduce the link scheduling error in the high frequency selective channel influence environment, it is possible to allocate plural MCIDs for the two-hop link.

In the link scheduling method using single or multiple MCIDs, the basic operation procedures of the transmission, relay, and recipient terminals are compatible with those of the technology of the related art. More particularly, since the MCID proposed in the present disclosure has the same format as the CID of the technology of the related art and shared the same resource range, the operation of the transmission terminal for transmitting the data to the relay terminal and the operation of the recipient terminal for receiving the data from the relay terminal are compatible to normal links for the legacy single-hop communication without an increase in complexity for implementing the two-hop communication.

Figure 11:
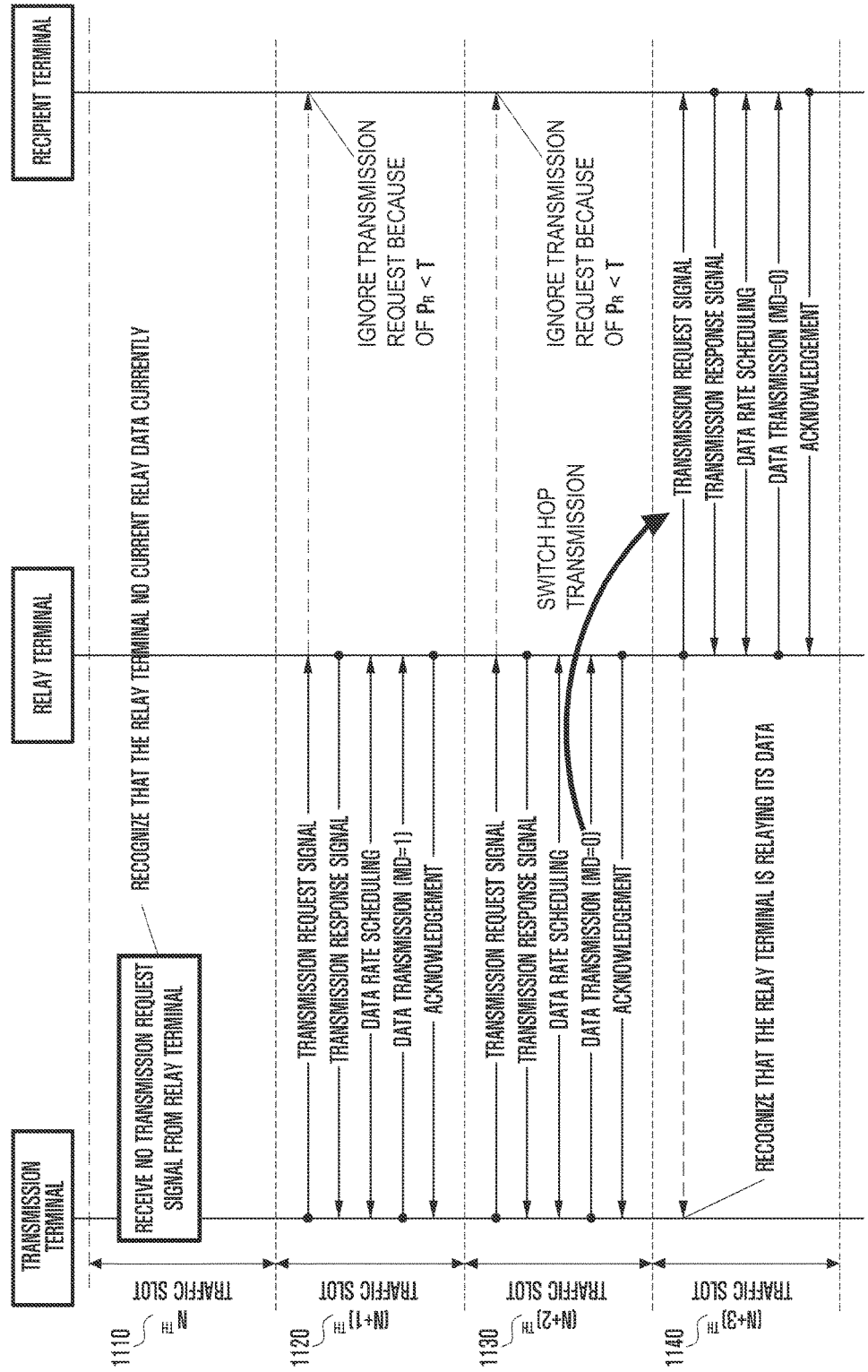
FIG. 11 is a signal flow diagram illustrating a two-hop link data transmission procedure with basic operations of transmission, relay, and recipient terminals according to an embodiment of the present disclosure.

FIG. 11 is a signal flow diagram illustrating a two-hop link data transmission procedure with basic operations of transmission, relay, and recipient terminals according to an embodiment of the present disclosure.

Referring to FIG. 11, the transmission terminal having the data to be transmitted to the recipient terminal observes the transmission unit(s) corresponding to MCID in the Tx OFDM block of the $n^{th}$ traffic slot 1110 to determine that the relay terminal is not performing any two-hop link transmission currently.

If it is determined that the relay terminal does not perform transmission to the recipient terminal, the transmission terminal transmits a transmission request signal on the transmission unit(s) corresponding to the MCID in the Tx OFDM block of the $(n+1)^{th}$ traffic slot 1120. If the transmission request signal is received, the recipient terminal determines whether the corresponding signal strength is lower than a certain threshold value (i.e., a single MCID method) or interprets the meaning of the corresponding signal (i.e., a multi-MCID method) to determine that the signal is not addressed to itself.

If the transmission request signal transmitted by the transmission terminal is received, the relay terminal determines the link usage availability in consideration of the signal interference with other links and sends the transmission terminal the transmission response signal notifying of the link usage availability. As a result of the data rate scheduling, if it is determined that the entire data cannot be transmitted in the current traffic slot, the transmission terminal sends the partial data including the MD bit set to 1 to the relay terminal.

In the $(n+2)^{th}$ traffic slot 1130, the transmission terminal sends the relay terminal the residual data through the same procedure as the previous traffic slot along with the MD bit set to 0 to indicate that the corresponding data is the last data.

If it is determined, based on the MD=0, that the entire data to be relayed is received completely, the relay terminal forwards the data to the recipient terminal in the $(n+3)^{th}$ traffic slot 1140. At this time, the transmission terminal observes the transmission request signal transmitted by the relay terminal in the Tx OFDM block to determine that the data transmitted by itself is being delivered to the recipient terminal.

The relay terminal forwards the entire data to the recipient terminal in the $(n+3)^{th}$ traffic slot and terminates the two-hop link data transmission. The two-hop link data transmission method is capable of determining the data integrity based on the acknowledgement in response to the data transmission in a unit of a traffic slot, it is possible to guarantee the data integrity in the two-hop communication.

The relay terminal newly defined in the present disclosure is the terminal assisting data transmission between the transmission and recipient terminal and guarantees the reliable communication service to the user of the corresponding terminal. In order to accomplish this, the relay terminal has a capability of working as transmission and recipient terminals for single-hop/two-hop link communication as well as the relay role. In such a situation, if the relay data are concentrated to the terminal so as not to work for other roles, the user of the relay terminal undergoes the service quality degradation and thus, is likely to avoid taking the role as a relay afterward.

In order to mitigate this issue, the present disclosure proposes a method of restricting the relay data amount to be transmitted from the transmission terminal to the relay terminal. In this method, the transmission of the data having the MD bit set to 1 is limited to a certain number of transmissions (K) such that the relay terminal is capable of performing its roles as a transmission terminal and/or a recipient terminal.

In addition to the two-hop link establishment method followed by a link scheduling method, the present disclosure proposes a method for determining the priorities of the link transmissions where the relay terminal is working as the recipient or transmission terminal for another single-hop link transmission.

This link priority determination method can be classified into one of 1) the method based on the priority of MCIDs of the links and 2) the method based on the media access probability.

In the first method, the terminal processes the link having the highest priority in the current traffic slot among the plural links on which it takes different roles.

Figure 12:
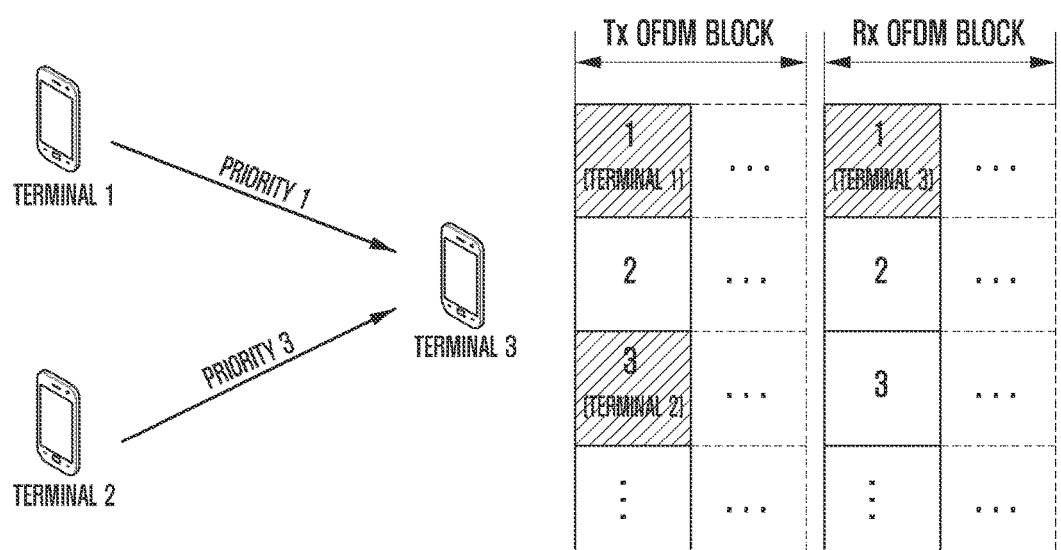
FIG. 12 is a diagram illustrating an operation of a terminal working as a relay terminal and a recipient terminal on two different links according to an embodiment of the present disclosure.

FIG. 12 is a diagram illustrating an operation of a terminal working as a relay terminal and a recipient terminal on two different links according to an embodiment of the present disclosure.

Referring to FIG. 12, the terminal 1 is a transmission terminal on a two-hop link, the terminal 2 is a transmission terminal on another link, and the terminal 3 is the relay terminal receiving data from the terminals 1 and 2. It is assumed that the two-hop link has the priority 1 and the other link has the priority 3 in the current traffic slot.

In the Tx OFDM block, the terminals 1 and 2 transmit the transmission request signal on the resource units having the first and third priorities (resource units 1 and 3) for data transmission, respectively. If the transmission request signals are detected on the resource units 1 and 3, the terminal 3 transmits the transmission response signal on the resource unit 1 of the Rx OFDM block for performing the communication on the two-hop link having the higher priority.

Figure 13A:
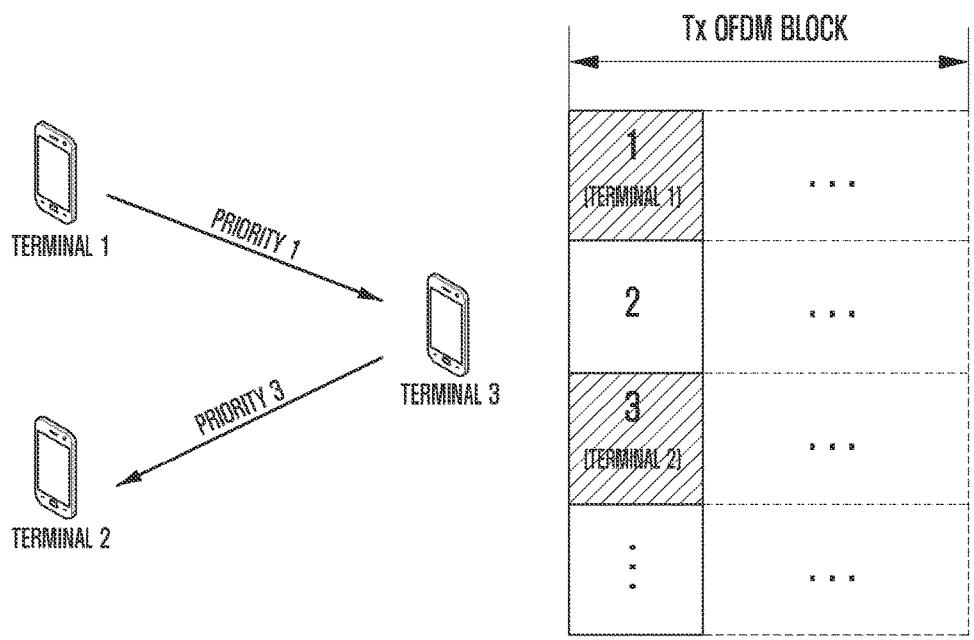
FIGS. 13A and 13B are diagrams illustrating an operation of a terminal working as a relay terminal and a transmission terminal on two different links according to an embodiment of the present disclosure.
Figure 13B:
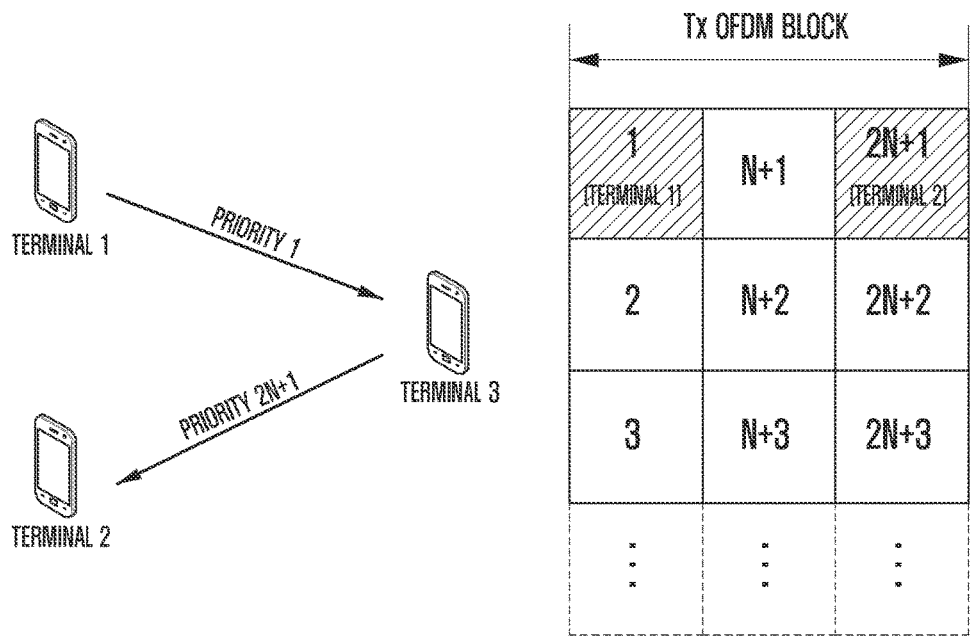

FIGS. 13A and 13B are diagrams illustrating an operation of a terminal working as a relay terminal and a transmission terminal on two different links according to an embodiment of the present disclosure.

Referring to FIGS. 13A and 13B, the terminal 1 is the transmission terminal on the two-hop link, the terminal 2 is the recipient terminal on another link, and the terminal 3 is the relay terminal receiving the relay data from the terminal 1 and transmitting data to the terminal 2 on the other link. Since, the terminal operates in semi-bidirectional transmission scheme, it is impossible to perform signal transmission and reception simultaneously.

FIG. 13A shows the case where the two-hop link and the other link have the priorities 1 and 3, respectively. In this case, the terminal 3 determines whether there is a single tone signal transmitted by the terminal 1 instead of transmitting the transmission request signal for data transmission to the terminal 2 in order to receive the data from the terminal 1 on the link having the higher priority. If the transmission request signal is detected on the corresponding transmission unit 1, the terminal 3 transmits the transmission response signal to the terminal 1 on the transmission unit 1 of the Rx OFDM block.

FIG. 13B shows the case where the two-link and the other link have the priorities 3 and 1, respectively. In this case, since the other link has the priority higher than that of the two-hop link, the terminal 3 transmits the transmission request signal for data transmission to the terminal 2 on the transmission unit 1 instead of detecting the transmission request signal from the terminal 1 in the Tx OFDM block.

Instead of the link priority determination method based on the MCID priority of the link, it can be considered to determine the link priority based on the media access priority in some cases for improvement of an entire network throughput.

This method is for the terminal to select the link having the highest probability of actual data transmission by accessing the media in the current traffic slot among the links. More specifically, the media access probability-based link selection method can be classified into one of a method considering the transmission and reception simultaneously and a method considering receptions on multiple links.

If the terminal considers reception on another link, this means that the terminal listens to the corresponding link to determine the presence of the transmission request signal on the transmission unit. If the terminal considers transmission, this means that the terminal has the data to transmit. Accordingly, if the terminal considers the transmission and reception simultaneously, it is advantageous to consider the transmission link on which the presence of the transmission is certain as compared to the reception link on which the presence of the reception is uncertain from the view point of the entire throughput. If the terminal considers the simultaneous signal reception on multiple links, it is preferred to select the link having the highest probability of actual data transmission with the highest SIR among the links. If the terminal considers the simultaneous signal transmission on the multiple terminals, it is preferred to select the link on which the response is received first in response to the transmission request signals that are transmitted on all the corresponding links.

Figure 14A:
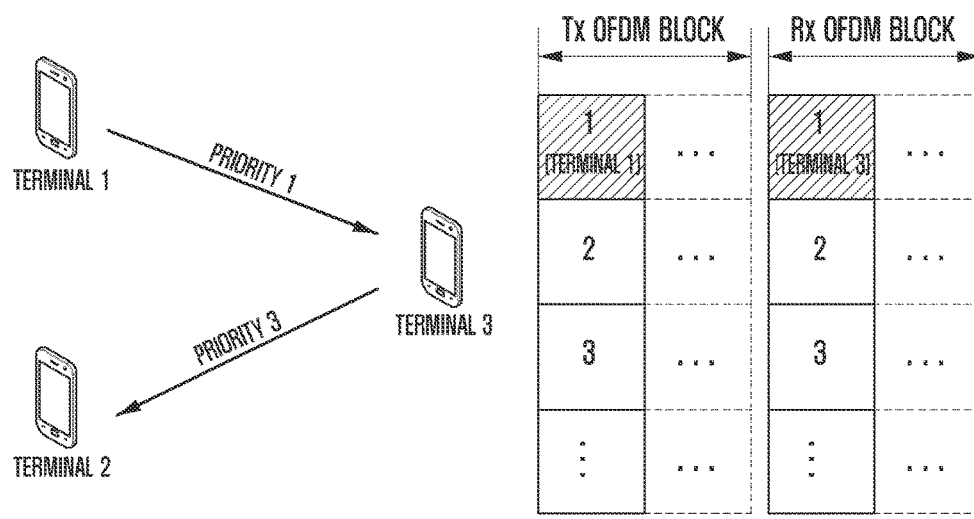
FIGS. 14A and 14B are diagrams illustrating an operation of a terminal working in multiples roles to select a link based on a media access probability according to an embodiment of the present disclosure.
Figure 14B:
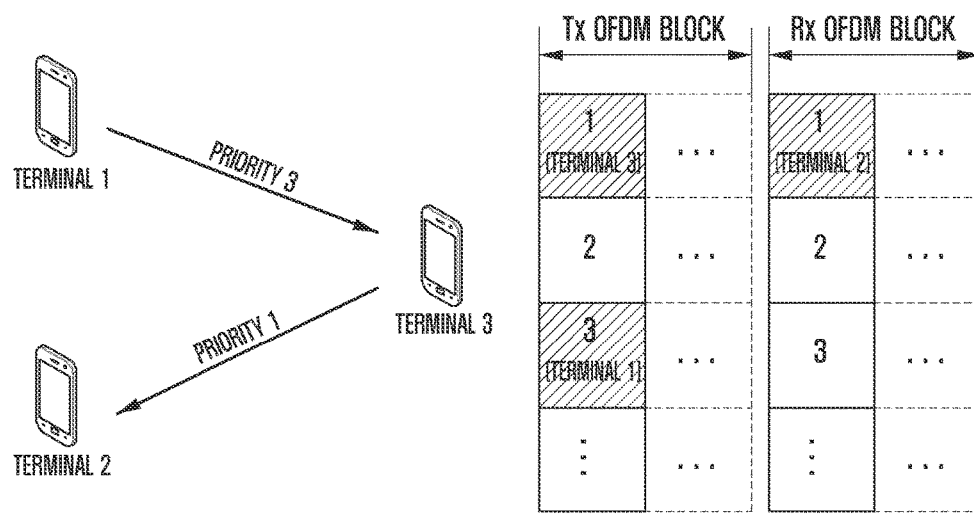

FIGS. 14A and 14B are diagrams illustrating an operation of a terminal working in multiples roles to select a link based on a media access probability according to an embodiment of the present disclosure.

Referring to FIGS. 14A and 14B, the terminal 1 is the transmission terminal on the two-hop link, the terminal 2 is the recipient terminal to which the terminal 3 attempts to transmit data, and the terminal 3 is the relay terminal on the two-hop link. FIG. 14A shows the case where the transmission units according to the priorities of the two-hop link and the link to the terminal 2 are 1 and 3 in the same OFDM symbol of the current slot and the terminal 3 has the data to be transmitted to the terminal 2.

Referring to FIG. 13A, the priority of terminal 3 has to detect the transmission request signal from the transmission terminal on the transmission unit 1 for two-hop link communication having the higher priority.

In spite of the existence of the data to be transmitted to the terminal 2, if the terminal 3 abandons the data transmission to detect the transmission request signal from the terminal 1 having the uncertainty on the data transmission to the terminal 3, this is inefficient in the environment where the transmission frequency of the terminal 1 is low. In the present disclosure, if the importance (a Quality of Service (QoS) or a requirement) of the data to be transmitted to the terminal 2 is higher than a certain level, the terminal 3 is capable of transmitting the transmission request signal to the terminal 2 other than observing the transmission request signal from the terminal 1 regardless of the priorities of the links so as to mitigate the above-described issue.

Referring to FIG. 14B, it is assumed that the two hop link uses the transmission unit 1, and the link between the terminals 2 and 3 uses the transmission unit 2N+1 (where N denotes a number of subcarriers of the corresponding OFDM signal). The transmission units 1 and 2 N+1 are located at different time positions in the Tx OFDM block as shown in the drawing. In this case, the present disclosure proposes a method for the terminal 3 to observe the transmission request signal from the transmission terminal of the two hop link on the transmission unit 1 and, if no transmission request signal is received, transmit the transmission request signal to the terminal 2 on the transmission unit 2N+1 in the subsequent OFDM symbol so as to improve the network performance.

Figure 15:
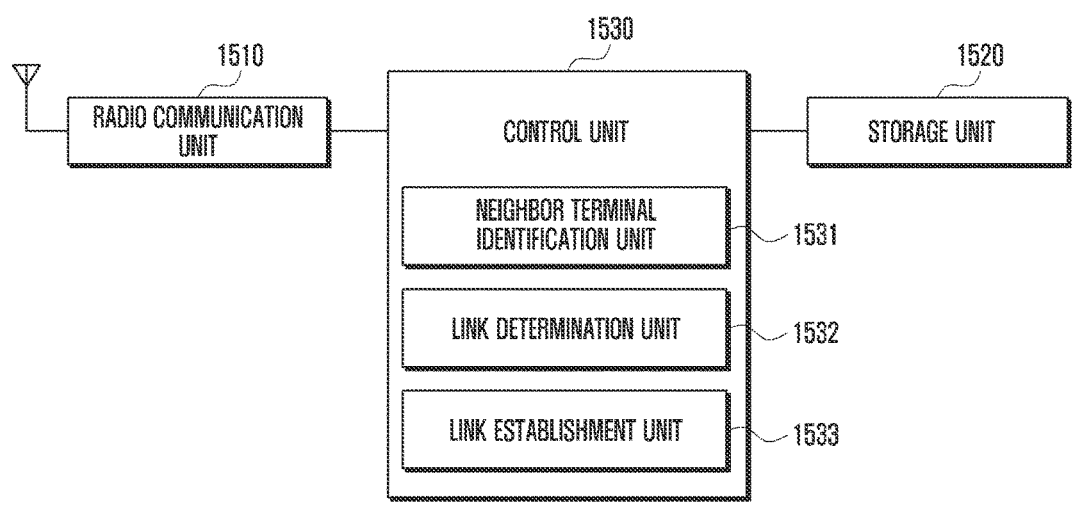
FIG. 15 is a block diagram illustrating a configuration of a transmission terminal according to an embodiment of the present disclosure.

FIG. 15 is a block diagram illustrating a configuration of a transmission terminal according to an embodiment of the present disclosure.

Referring to FIG. 15, the transmission terminal includes a radio communication unit 1510, a storage unit 1520, and a control unit 1530.

The radio communication unit 1510 is responsible for transmitting and receiving signals carrying data to and from the transmission terminal. The radio communication unit 1510 may include a Radio Frequency (RF) transmitter for up-converting and amplifying the transmission signal and an RF receiver for low noise amplifying and down-converting the received signal. The radio communication unit 1510 is also capable of transferring the data received over the radio channel to the control unit 1530 and transmitting the data output from the control unit 1530 over the radio channel.

The storage unit 1520 is responsible for storing programs and data associated with the operations of the transmission terminal. According to an embodiment of the present disclosure, the storage unit 1520 stores the programs for performing the procedure for transmitting the data to the recipient terminal via the relay terminal.

The control unit 1530 controls the overall operations of the transmission terminal and signal flows among the function blocks of the terminal. The control unit 1530 includes a neighboring terminal detection unit 1531, a link determination unit 1532, and a link establishment unit 1533.

The neighboring terminal identification unit 1531 identifies the neighboring terminals for communication. For this purpose, the neighboring terminal identification unit 1531 identifies the neighboring terminals geometrically. More specifically, the neighboring terminal identifier 1530 receives the terminal search signals including the identity information from at least one recipient terminal and generates a neighboring terminal list including the neighboring terminals with the recipient signal strengths of the terminal search signals. The neighboring terminal identification unit 1531 determines the presence of the recipient terminal based on the neighboring terminal list.

The link determination unit 1532 selects the terminal to communicate among the identified terminals and determines the type of the communication link with the selected terminal, i.e., a single hope link or a two-hop link. In this case, the link determination unit 1532 selects one of the signal hop link and two-hop link depending on the received signal strength from the recipient terminal.

If it is determined to use the two-hop link, the link establishment unit 1533 selects a relay terminal to establish a two-hop link. More particularly, the link establishment unit 1533 broadcasts a relay request message including at least one of a transmission terminal identifier, a recipient terminal identifier, a service type of the data to be transmitted, a relay time, or the like. The link establishment unit 1533 selects the terminal which has transmitted the relay accept message in response to the relay request message.

The link establishment unit 1533 also allocates at least one MCID for identifying the two-hop link. In order to allocate an MCID, the link establishment unit 1533 allocates at least one of CIDs available in all of the terminals (i.e., a transmission terminal, a relay, and recipient terminals) as the MCID.

The link establishment unit 1533 controls such that the data addressed to the recipient terminal is transmitted to the recipient terminal through the two-hop link established via the relay terminal. In this case, the link establishment unit 1533 transmits the data on the transmission unit identified with the MCID.

The link establishment unit 1533 determines whether the entire data can be transmitted in the current traffic slot. If it is determined that the entire data can be transmitted in the current traffic slot, the link establishment unit 1533 instructs to complete data transmission and, otherwise, transmits a more data indicator (i.e., an MD bit) to the recipient terminal.

Figure 16:
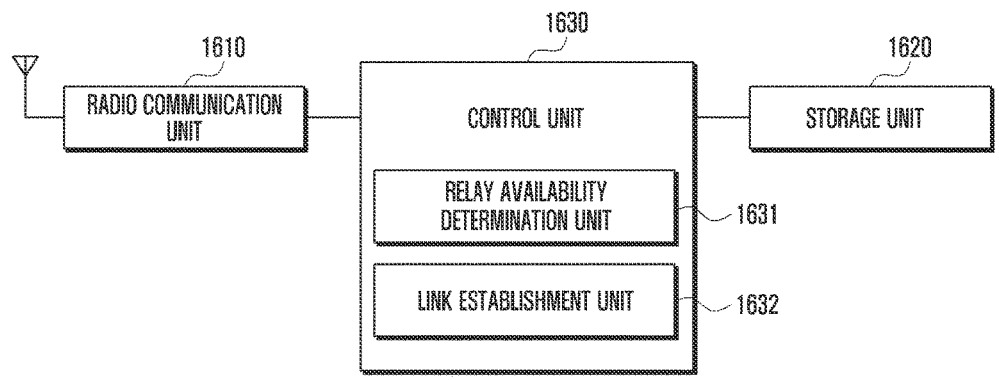
FIG. 16 is a block diagram illustrating a configuration of a relay terminal according to an embodiment of the present disclosure.

FIG. 16 is a block diagram illustrating a configuration of a relay terminal according to an embodiment of the present disclosure.

Referring to FIG. 16, the relay terminal of the present disclosure includes a radio communication unit 1610, a storage unit 1620, and a control unit 1630.

The radio communication unit 1610 is responsible for transmitting and receiving signals carrying data to and from the relay terminal. The radio communication unit 1610 may include an RF transmitter for up-converting and amplifying the transmission signal and an RF receiver for low noise amplifying and down-converting the received signal. The radio communication unit 1610 is also capable of transferring the data received over the radio channel to the control unit 1630 and transmitting the data output from the control unit 1630 over the radio channel.

The storage unit 1620 is responsible for storing programs and data associated with the operations of the relay terminal. According to an embodiment of the present disclosure, the storage unit 1620 stores the programs for performing the procedure for relaying the data from the transmission terminal to the recipient terminal.

The control unit 1630 controls the overall operations of the relay terminal and signal flows among the function blocks of the terminal. The control unit 1630 includes a relay availability determination unit 1631 and a link establishment unit 1632.

The relay availability determination unit 1631 determines, when a relay request message is received, whether it can relay the data from the transmission terminal to the recipient terminal. In this case, if the received signal strengths from transmission and recipient terminals are equal to or greater than a certain signal strength level and if the candidate relay terminal is located between the transmission and recipient terminals, the candidate relay terminal determines that it can relay the communication between the transmission and recipient terminals.

If it is determined that terminal can work as the relay terminal, the link establishment unit 1632 of the relay terminal sends the transmission terminal a relay accept message to establish the two-hop link. The link establishment unit 1632 relays the data from the transmission terminal to the recipient terminal using at least one MCID allocated for the two-hop link. In this case, the MCID can be selected among the CIDs available at all the transmission, relay, and recipient terminals.

If a transmission request signal for data transmission is received from the transmission terminal at the signal strength equal to or greater than a certain level, the link establishment unit 1632 compares the received signal strength from the transmission terminal and the interference signal strengths on other links having higher priorities to determine whether the relay is possible. If it is determined that the relay is possible, the link establishment unit 1632 controls such that the relay response message is transmitted to the transmission terminal.

The link establishment unit 1632 is also capable of processing the link identified with the MCID having the highest priority first among plural links to be processed by the relay terminal in the current traffic slot. According to another embodiment of the present disclosure, the link establishment unit 1632 is capable of processing the transmission link first with the priority as compared to the reception link.

Figure 17:
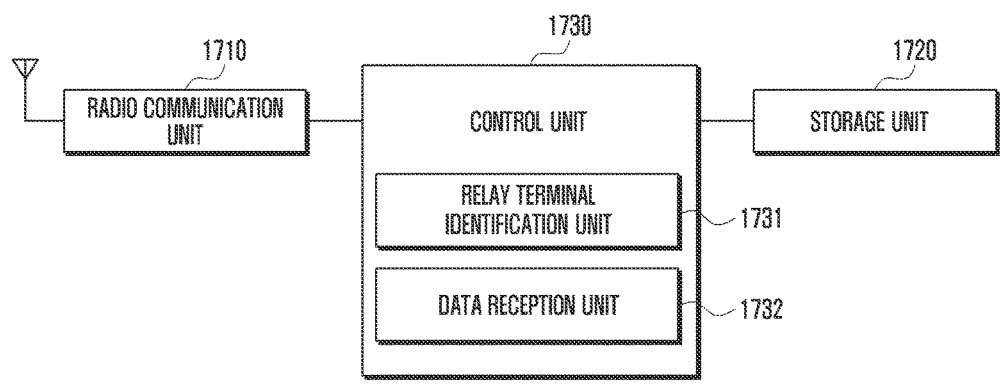
FIG. 17 is a block diagram illustrating a configuration of a recipient terminal according to an embodiment of the present disclosure.

FIG. 17 is a block diagram illustrating a configuration of a recipient terminal according to an embodiment of the present disclosure.

Referring to FIG. 17, the recipient terminal includes a radio communication unit 1710, a storage unit 1720, and a control unit 1730.

The radio communication unit 1710 is responsible for transmitting and receiving signals carrying data to and from the relay terminal. The radio communication unit 1710 may include an RF transmitter for up-converting and amplifying the transmission signal and an RF receiver for low noise amplifying and down-converting the received signal. The radio communication unit 1710 is also capable of transferring the data received over the radio channel to the control unit 1730 and transmitting the data output from the control unit 1730 over the radio channel.

The storage unit 1720 is responsible for storing programs and data associated with the operations of the recipient terminal.

The control unit 1730 controls the overall operations of the recipient terminal and signal flows among the function blocks of the terminal. The control unit 1730 includes a relay terminal identification unit 1731 and a data reception unit 1732.

The relay terminal identification unit 1731 receives the relay accept message from the terminal, which accepts to relay data transmission from the transmission terminal to the recipient terminal, to identify the relay terminal on the two-hop link.

If the transmission request signal having the received signal strength higher than a certain level is received from the relay terminal, the data reception control unit 1732 determines whether the data reception from the relay terminal is possible. If it is determined that the data reception via the relay terminal is possible, the data reception control unit 1732 transmits the transmission response message to the relay terminal. Thereafter, the data reception control unit 1732 controls such that the data transmitted by the relay terminal is received.

In this case, the two-hop link is identified with at least one MCID.

The control unit 1730 may receive the relay response message including CIDs available at both the transmission and relay terminals to determine the MCID for use in the two-hop link communication from the relay terminal. The control unit 1730 compares the CIDs available at both the transmission and relay terminals with those available at the recipient terminal to select one of the CIDs available at all the transmission, relay, and recipient terminals as the MCID. The control unit 1730 generates an acknowledgement message including the MCID and transmits the acknowledgement message to the transmission terminal via the relay terminal.

Although the description is directed to the case where the control unit 1730, the relay terminal identification unit 1731, and the data reception control unit 1732 are configured separately to perform their respective functions, the present disclosure is not limited thereto. For example, the function of the relay terminal identification unit 1731 can be performed by the control unit 1730 itself, and this principle is applicable to the configurations of the terminals in FIGS. 15 to 17.

As described above, the two-hop link communication method and apparatus of the present disclosure is capable of facilitating the two-hop link communication within an extended range with reduced complexity and overhead. In addition, the two-link communication method and apparatus of the present disclosure is capable of utilizing the CIDs limited in local reuse efficiently while supporting backward compatibility to the legacy terminals.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A two-hop link transmission method of a transmission terminal in a wireless communication system, the method comprising:
    determining a relay terminal among neighbor terminals;
    establishing a two-hop link with a recipient terminal via the relay terminal;
    allocating a multi-hop connection identifier (MCID) for the two-hop link;
    mapping data to a transmission unit identified by the MCID;
    determining whether an entire data transmission is possible in a current traffic slot;
    indicating, if the entire data transmission is possible, data transmission is complete;
    generating, if the entire data transmission is impossible, a more data indicator;
    transmitting the more data indicator to the recipient terminal, the more data indicator being limited in transmission to a predetermined number of times; and
    transmitting a transmission request signal at a signal strength equal to or greater than a predetermined level to the relay terminal,
    wherein whether a data relay is possible is determined by the relay terminal,
    wherein the determining of whether the data relay is possible is based on a comparison result between the signal strength from the transmission terminal and a signal interference strength on other links having higher priorities, and
    wherein the relay terminal processes a link having the MCID with highest priority first in a current traffic slot among plural links to be processed.

2. The method of claim 1, further comprising:
    receiving at least one terminal search signal including identity information of a neighbor terminal;
    generating a neighbor terminal list based on the at least one terminal search signal; and
    determining a presence of the recipient terminal based on the neighbor terminal list.

3. The method of claim 1, wherein the determining of the relay terminal comprises:
    broadcasting a first message including at least one of a transmission terminal identifier, a recipient terminal identifier, a service type, a quality of data to be transmitted, or a relay time; and
    determining the relay terminal to transmit a second message in response to the first message.

4. The method of claim 3,
    wherein the first message is received by the relay terminal, and
    wherein the determining of whether the relay of the data is possible comprises:
        determining whether a position of the relay terminal and communication environment between the transmission terminal and the recipient terminal are appropriate for data relay, and
        determining whether the relay terminal is capable of supporting a transmission relay between the transmission terminal and the recipient terminal.

5. The method of claim 1, further comprising:
    determining the MCID for the two-hop link with the recipient terminal; and
    receiving a third message including the MCID determined by the recipient terminal,
    wherein the determining of the MCID comprises:
        receiving information on connection identifiers (CIDs) available at both the transmission and relay terminals from the relay terminal, and
        determining the MCID based on the CIDs available at both the transmission and relay terminals and CID available at the recipient terminal.

6. The method of claim 5,
wherein the determination of the MCID further comprises:
    receiving a fourth message including information on the CIDs available at both the transmission and relay terminals from the relay terminal,
    comparing the CIDs available at both the transmission and relay terminals with a CID available at the recipient terminal, and
    determining a CID that matches the MCID.

7. The method of claim 1, wherein the MCID is determined among connection identifiers (CIDs) available at all of the transmission, relay, and recipient terminals.

8. A transmission terminal performing two-hop transmission in a wireless communication system, the terminal comprising:
- a memory configured to store instructions therein;
- a transceiver configured to transmit and receive signals; and
- at least one processor, upon execution of the instructions, configured to:
  - determine a relay terminal among neighbor terminals,
  - establish a two-hop link with a recipient terminal via the relay terminal,
  - allocate a multi-hop connection identifier (MCID) for the two-hop link,
  - map data to a transmission unit identified by the MCID,
  - determine whether an entire data transmission is possible in a current traffic slot,
  - indicate, if the entire data transmission is possible, data transmission is complete,
  - generate, if the entire data transmission is impossible, a more data indicator,
  - transmit the more data indicator to the recipient terminal, the more data indicator being limited in transmission to a predetermined number of times, and
  - transmit a transmission request signal at a signal strength equal to or greater than a predetermined level to the relay terminal,
- wherein whether a data relay is possible is determined by the relay terminal,
- wherein the determining of whether the data relay is possible is based on a comparison result between the signal strength from the transmission terminal and a signal interference strength on other links having higher priorities, and
- wherein the relay terminal processes a link having the MCID with highest priority first in a current traffic slot among plural links to be processed.

9. The terminal of claim 8, wherein the at least one processor is further configured to:
- receive at least one terminal search signal including identity information of a neighbor terminal,
- generate a neighbor terminal list based on the at least one terminal search signal, and
- determine a presence of the recipient terminal based on the neighbor terminal list.

10. The terminal of claim 8, wherein the at least one processor is further configured to:
- broadcast a first message including at least one of a transmission terminal identifier, a recipient terminal identifier, a service type of data to be transmitted, a quality of data to be transmitted, or a relay time, and
- determine the relay terminal to transmit a second message in response to the first message.

11. The terminal of claim 10,
- wherein the first message is received by the relay terminal, and
- wherein, to determine whether the relay of the data is possible, whether a position of the relay terminal and a communication environment between the transmission terminal and the recipient terminal are appropriate for data relay is determined, and whether the relay terminal is capable of supporting a transmission relay between the transmission terminal and the recipient terminal is determined.

12. The terminal of claim 8, wherein the at least one processor is further configured to assign a connection identifier (CID) that is available at all of the same transmission, relay, and recipient terminals as the MCID.

13. The terminal of claim 8, wherein the at least one processor is further configured to:
- determine the MCID for the two-hop link with the recipient terminal; and
- receive a third message including the MCID determined by the recipient terminal,
- wherein, to determine the MCID, the at least one processor is configured to:
  - receive information on connection identifiers (CIDs) available at both the transmission and relay terminals from the relay terminal, and
  - determine the MCID based on the CIDs available at both the transmission and relay terminals and CID available at the recipient terminal.

14. The terminal of claim 13,
- wherein, to determine the MCID, the at least one processor is configured to:
  - receive a fourth message including information on CIDs available at both the transmission and relay terminals from the relay terminal,
  - compare the CIDs available at both the transmission and relay terminals with a CID available at the recipient terminal, and
  - determine a CID that matches the MCID.

15. The terminal of claim 8, wherein the MCID is selected among connection identifiers (CIDs) available at all of the transmission, relay, and recipient terminals.

* * * * *